United States Patent
Tie et al.

(10) Patent No.: US 12,200,580 B2
(45) Date of Patent: Jan. 14, 2025

(54) MESSAGE TRANSMISSION METHOD AND CORRESPONDING DEVICE

(71) Applicant: Huawei Technologies Co., Ltd., Shenzhen (CN)

(72) Inventors: Xiaolei Tie, Shanghai (CN); Zhanzhan Zhang, Shanghai (CN); Wenwen Huang, Shanghai (CN); Han Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 458 days.

(21) Appl. No.: 17/554,955

(22) Filed: Dec. 17, 2021

(65) Prior Publication Data

US 2022/0109965 A1   Apr. 7, 2022

Related U.S. Application Data

(63) Continuation of application No. PCT/CN2020/095037, filed on Jun. 9, 2020.

(30) Foreign Application Priority Data

Jun. 18, 2019   (CN) .......................... 201910527633.0

(51) Int. Cl.
  *H04W 4/14*   (2009.01)
  *H04W 52/02*  (2009.01)
(52) U.S. Cl.
  CPC ......... *H04W 4/14* (2013.01); *H04W 52/0235* (2013.01)
(58) Field of Classification Search
  CPC .................................................... H04W 76/27
  See application file for complete search history.

(56) References Cited

U.S. PATENT DOCUMENTS

| 2019/0150114 A1* | 5/2019 | Liu ................... H04W 52/0229 370/252 |
| 2019/0297577 A1* | 9/2019 | Lin ................... H04W 52/0229 |
| 2020/0229092 A1* | 7/2020 | Wu ........................ H04W 76/11 |

FOREIGN PATENT DOCUMENTS

| CN | 103636264 A | 3/2014 |
| CN | 109496452 A | 3/2019 |

(Continued)

OTHER PUBLICATIONS

"Report of email discussion to progress open issues on WUS," 3GPP TSG RAN WG2 #102, Busan, South Korea, Tdoc R2-1807097, Total 17 pages, 3rd Generation Partnership Project, Valbonne, France (May 21-25, 2018).

(Continued)

*Primary Examiner* — Joseph E Avellino
*Assistant Examiner* — Maryam Emadi
(74) *Attorney, Agent, or Firm* — Leydig, Voit & Mayer, Ltd.

(57) ABSTRACT

A message transmission method is provided. User equipment may receive a power saving message from a network device, where the power saving message carries indication information of a short message, and the short message includes at least one of the following: a public warning system notification or system information modification information. Then, the user equipment obtains the short message from the power saving message. In this way, when the user equipment is in a connected state, the user equipment may obtain the short message by using the power saving message, for example, a PoSS, instead of by monitoring a paging PDCCH; and when the UE is in a sleep state, the UE is not woken up to monitor the paging PDCCH. This reduces power consumption of the user equipment in the connected state.

20 Claims, 4 Drawing Sheets

(56) References Cited

FOREIGN PATENT DOCUMENTS

| CN | 109644408 A | 4/2019 | | |
|---|---|---|---|---|
| WO | WO-2011137383 A1 | * | 11/2011 | ............ H04L 1/1829 |
| WO | 2018175760 A1 | 9/2018 | | |
| WO | 2018216871 A1 | 11/2018 | | |
| WO | 2019033112 A1 | 2/2019 | | |
| WO | 2019063479 A1 | 4/2019 | | |
| WO | 2019095331 A1 | 5/2019 | | |
| WO | 2019098801 A1 | 5/2019 | | |

OTHER PUBLICATIONS

"Downlink channel power efficiency for MTC," 3GPP TSG-RAN WG1 Meeting #90bis, Prague, Czech Republic, R1-1716997, Total 14 pages, 3rd Generation Partnership Project, Valbonne, France (Oct. 9-13, 2017).

Huawei, HiSilicon, "On 'wake-up signal' for paging and connected-mode DRX," 3GPP TSG RAN WG1 Meeting #89, Hangzhou, China, R1-1707021, total 10 pages, 3rd Generation Partnership Project, Valbonne, France (May 15-19, 2017).

"3rd Generation Partnership Project; Technical Specification Group Radio Access Network; NR; Physical layer procedures for control (Release 15)," 3GPP TS 38.213 V15.5.0, total 104 pages, 3rd Generation Partnership Project, Valbonne, France (Mar. 2019).

"3rd Generation Partnership Project; Technical Specification Group Radio Access Network; NR; Medium Access Control (MAC) protocol specification (Release 15)," 3GPP TS 38.321 V15.5.0, total 78 pages, 3rd Generation Partnership Project, Valbonne, France (Mar. 2019).

"3rd Generation Partnership Project; Technical Specification Group Radio Access Network; NR; Radio Resource Control (RRC) protocol specification (Release 15)," 3GPP TS 38.331 V15.5.1, total 491 pages, 3rd Generation Partnership Project, Valbonne, France (Apr. 2019).

* cited by examiner

MESSAGE TRANSMISSION METHOD AND CORRESPONDING DEVICE

CROSS-REFERENCE TO RELATED APPLICATIONS

This application is a continuation of International Application No. PCT/CN2020/095037, filed on Jun. 9, 2020, which claims priority to Chinese Patent Application No. 201910527633.0, filed on Jun. 18, 2019. The disclosures of the aforementioned applications are hereby incorporated by reference in their entireties.

TECHNICAL FIELD

This application relates to the field of communication technologies, and specifically, to a message transmission method and a corresponding device.

BACKGROUND

Connected discontinuous reception (C-DRX) may be configured for a radio resource control (RRC) connected state, to enable user equipment (UE) to monitor a physical downlink control channel (PDCCH) only in a discontinuous reception on duration (DRX On Duration) of each discontinuous reception cycle (DRX cycle), and enter a sleep state in a remaining duration. In this way, power consumption of the UE is reduced.

In Release 16 (R16), the 3rd generation partnership project (3GPP) introduces a new research project, that is, research on power saving (power saving) of UE in new radio (NR). In this research project, a new power saving signal (PoSS) may be introduced. The POSS may be used to indicate whether the UE needs to be woken up in next one or more DRX cycles to monitor a PDCCH. In this way, if the POSS indicates that the UE does not need to be woken up in the next several DRX cycles, the UE does not need to be woken up in each DRX on duration. This can further reduce power consumption of the UE.

When the UE is in the RRC connected state, the UE needs to monitor not only a discontinuous reception PDCCH but also a paging PDCCH in the DRX cycle. The UE in the RRC connected state monitors the paging PDCCH mainly to obtain a short message namely, system information modification (SI modification) information and/or a public warning system (PWS) notification, in paging downlink control information (DCI). To monitor the short message, the UE needs to monitor the paging PDCCH at least once in each default paging cycle. Consequently, even if the POSS indicates that the UE can be always in the sleep state in one or more DRX cycles, the UE may be still woken up to monitor the paging PDCCH. This prevents the power consumption of the UE from being reduced.

SUMMARY

Embodiments of this application provide a message transmission method, to reduce power consumption of UE. The embodiments of this application further provide a corresponding device.

A first aspect of this application provides a message transmission method. The method may include:
receiving a power saving message from a network device, where the power saving message carries indication information of a short message, and the short message includes at least one of the following: a public warning system notification or system information modification information; and
obtaining the short message from the power saving message.

In the first aspect, the power saving message may be a message having a power saving function, and is usually represented by a PoSS. The power saving message may include indication information indicating whether to wake up the UE, and may further include the indication information of the short message. It can be learned from the first aspect that when UE is in a connected state, the UE may obtain the short message by using the power saving message, for example, the POSS, instead of by monitoring a paging PDCCH. In this way, when the UE is in a sleep state, the UE is not woken up to monitor the paging PDCCH. This reduces power consumption of the UE in the connected state.

In a possible implementation of the first aspect, the power saving message is carried on a physical downlink control channel (PDCCH), and the indication information of the short message is located in downlink control information (DCI) or a demodulation reference signal (DMRS) of the power saving message.

In this possible implementation, the power saving message may be carried on the PDCCH, and the PDCCH used to carry the power saving message is different from the paging PDCCH. The indication information of the short message may be located in the DCI, and different flag bits (for example, bits) are used to indicate the public warning system notification or the system information modification information. The indication information of the short message may alternatively be located in the DMRS, and different cyclic shift sequences are used to indicate the public warning system notification or the system information modification information.

In a possible implementation of the first aspect, the downlink control information includes a first flag bit and a second flag bit, the first flag bit indicates the public warning system notification, and the second flag bit indicates the system information modification information; and
the obtaining the short message from the power saving message may include:
obtaining the public warning system notification from the first flag bit, and obtaining the system information modification information from the second flag bit.

In this possible implementation, using an example in which the flag bit is a bit, two bits in the DCI of the power saving message are used to indicate the public warning system notification and the system information modification information. In the two bits, if the first bit indicates the public warning system notification, the second bit indicates the system information modification information: conversely, if the first bit indicates the system information modification information, the second bit indicates the public warning system notification. Specifically; for each bit, 0) may be used to indicate that corresponding information does not exist, and 1 may be used to indicate that corresponding information exists: or F may be used to indicate that corresponding information does not exist, and T may be used to indicate that corresponding information exists. Certainly, specific indication forms are not limited to the several enumerated types, namely, 0, 1, F, and T, and other values or characters that can indicate whether the public warning system notification and the system information modification information exist are usable. It can be learned from this possible implementation that two bits are used to indicate the short message, so that the public warning system notification or the system information modification information can be directly obtained from the DCI of the power saving message, and the paging PDCCH does not need to be monitored. In this way, when the UE in the connected state is in the sleep state, the UE is not woken up to monitor the paging PDCCH. This reduces the power consumption of the UE in the connected state.

In a possible implementation of the first aspect, the downlink control information includes a third flag bit, a fourth flag bit, and a fifth flag bit, where the third flag bit indicates whether the short message exists:

when the third flag bit indicates that the short message exists, the fourth flag bit indicates the public warning system notification, and the fifth flag bit indicates the system information modification information; and the obtaining the short message from the power saving message may include:

when the third flag bit indicates that the short message exists, obtaining the public warning system notification from the fourth flag bit, and obtaining the system information modification information from the fifth flag bit.

In this possible implementation, using an example in which the flag bit is a bit, three bits in the DCI of the power saving message are used to indicate the short message, and the first bit in the three bits may be used to indicate whether the short message exists. If the first bit indicates that the short message exists, for indication information at the last two bits in the three bits, refer to the foregoing implementation with two bits for understanding. If the first bit in the three bits indicates that the short message does not exist, it may be considered that no short message needs to be obtained. In this case, the last two bits in the three bits may be used for other purposes such as high-reliability detection, or functions of the last two bits may be reserved for subsequent use.

In a possible implementation of the first aspect, the downlink control information includes a sixth flag bit, and the sixth flag bit indicates the public warning system notification or the system information modification information; and the obtaining the short message from the power saving message may include:

when the sixth flag bit indicates the public warning system notification, obtaining the public warning system notification from the sixth flag bit: or when the sixth flag bit indicates the system information modification information, obtaining the system information modification information from the sixth flag bit.

In this possible implementation, using an example in which the flag bit is a bit, one bit may be used to indicate one of the public warning system notification and the system information modification information. For example, considering that the UE monitors the public warning system notification for a larger quantity of times, and monitors the system information modification information for a smaller quantity of times, the bit may be used to indicate the public warning system notification. In this way, to a large extent, the UE does not need to be frequently woken up from the sleep state to monitor the public warning system notification, and the power consumption of the UE in the connected state can be reduced.

In a possible implementation of the first aspect, the message transmission method may further include:

when the sixth flag bit indicates the public warning system notification, obtaining the system information modification information from a paging physical downlink control channel: or when the sixth flag bit indicates the system information modification information, obtaining the public warning system notification from a paging physical downlink control channel.

In this possible implementation, if one of the public warning system notification or the system information modification information is indicated by using one bit, the other may be obtained by using the paging physical downlink control channel. For example, if the public warning system notification is indicated by using one bit in the DCI of the power saving message, the system information modification information may be obtained from the paging physical downlink control channel. It can be learned from this possible implementation that the power consumption of the UE in the connected state is reduced as much as possible on the premise that the short message is obtained.

In a possible implementation of the first aspect, the DMRS includes a first cyclic shift sequence, a second cyclic shift sequence, a third cyclic shift sequence, and a fourth cyclic shift sequence, and the four cyclic shift sequences correspond to four indication states of the short message, and are used to indicate the public warning system notification and the system information modification information. For example, the first cyclic shift sequence indicates that neither the public warning system notification nor the system information modification information exists, the second cyclic shift sequence indicates that the public warning system notification exists but the system information modification information does not exist, the third cyclic shift sequence indicates that the public warning system notification does not exist but the system information modification information exists, and the fourth cyclic shift sequence indicates that both the public warning system notification and the system information modification information exist. The first cyclic shift sequence, the second cyclic shift sequence, the third cyclic shift sequence, and the fourth cyclic shift sequence may each correspond to one DMRS sequence, or may each correspond to a plurality of DMRS sequences: or a part of the first cyclic shift sequence, the second cyclic shift sequence, the third cyclic shift sequence, and the fourth cyclic shift sequence may each correspond to one DMRS sequence, and the other part may each correspond to a plurality of DMRS sequences.

In this possible implementation, the first cyclic shift sequence, the second cyclic shift sequence, the third cyclic shift sequence, and the fourth cyclic shift sequence are different DMRS cyclic shift sequences. It can be learned from this possible implementation that different DMRS cyclic shift sequences are used to indicate the short message, so that the public warning system notification and the system information modification information can be directly obtained from the DMRS, and the paging PDCCH does not need to be monitored. In this way, when the UE in the connected state is in the sleep state, the UE is not woken up to monitor the paging PDCCH. This reduces the power consumption of the UE in the connected state.

In a possible implementation of the first aspect, the DMRS includes a fifth cyclic shift sequence and a sixth cyclic shift sequence, and the cyclic shift sequences are used to indicate the public warning system notification or the system information modification information. For example, when the fifth cyclic shift sequence and the sixth cyclic shift sequence are used to indicate the public warning system notification, the fifth cyclic shift sequence may be used to indicate that the public warning system notification exists, and the sixth cyclic shift sequence may be used to indicate that the public warning system notification does not exist. When the fifth cyclic shift sequence and the sixth cyclic shift sequence are used to indicate the system information modification information, the fifth cyclic shift sequence may be used to indicate that the system information modification information exists, and the sixth cyclic shift sequence may be used to indicate that the system information modification information does not exist.

In this possible implementation, different DMRS cyclic shift sequences may be used to indicate one of the public warning system notification and the system information modification information. For example, considering that the UE monitors the public warning system notification for a larger quantity of times, and monitors the system information modification information for a smaller quantity of times, the different DMRS cyclic shift sequences may be used to indicate the public warning system notification. In this way, to a large extent, the UE does not need to be frequently woken up from the sleep state to monitor the public warning system notification, and the power consumption of the UE in the connected state can be reduced.

In a possible implementation of the first aspect, the message transmission method may further include:

when the fifth cyclic shift sequence and the sixth cyclic shift sequence are used to indicate the public warning system notification, obtaining the system information modification information from a paging physical downlink control channel: or when the fifth cyclic shift sequence and the sixth cyclic shift sequence are used to indicate the system information modification information, obtaining the public warning system notification from a paging physical downlink control channel.

In this possible implementation, if one of the public warning system notification or the system information modification information is indicated by using different DMRS cyclic shift sequences, the other may be obtained by using the paging physical downlink control channel. For example, if the public warning system notification is indicated by using the fifth cyclic shift sequence and the sixth cyclic shift sequence, the system information modification information may be obtained from the paging physical downlink control channel. It can be learned from this possible implementation that the power consumption of the UE in the connected state is reduced as much as possible on the premise that the short message is obtained.

In a possible implementation of the first aspect, the power saving message is a wake-up signal (WUS). The power saving message may alternatively be a go to sleep signal (GTS).

A second aspect of this application provides a message transmission method. The method may include:

sending a power saving message to user equipment, where the power saving message carries indication information of a short message, the short message includes at least one of the following: a public warning system notification or system information modification information, and the indication information of the short message indicates the user equipment to obtain the short message from the power saving message.

In the second aspect, the power saving message may be a message having a power saving function, and is usually represented by a PoSS. The power saving message may include indication information indicating whether to wake up the UE, and may further include the indication information of the short message. It can be learned from the second aspect that a network device may include the indication information of the short message in the POSS that is to be sent to the UE. When the UE is in a connected state, the UE may obtain the short message by using the POSS instead of by monitoring a paging PDCCH. In this way, when the UE is in a sleep state, the UE is not woken up to monitor the paging PDCCH. This reduces power consumption of the UE in the connected state.

In a possible implementation of the second aspect, the power saving message is carried on a physical downlink control channel PDCCH, and the indication information of the short message is located in downlink control information DCI or a demodulation reference signal DMRS of the power saving message.

In this possible implementation, the power saving message may be carried on the PDCCH, and the PDCCH used to carry the power saving message is different from the paging PDCCH. The indication information of the short message may be located in the DCI, and different flag bits (for example, bits) are used to indicate the public warning system notification or the system information modification information. The indication information of the short message may alternatively be located in the DMRS, and different cyclic shift sequences are used to indicate the public warning system notification or the system information modification information.

In a possible implementation of the second aspect, the downlink control information includes a first flag bit and a second flag bit, the first flag bit indicates the public warning system notification, and the second flag bit indicates the system information modification information.

In this possible implementation, using an example in which the flag bit is a bit, two bits in the DCI of the power saving message are used to indicate the public warning system notification and the system information modification information. In the two bits, if the first bit indicates the public warning system notification, the second bit indicates the system information modification information: conversely, if the first bit indicates the system information modification information, the second bit indicates the public warning system notification. Specifically, for each bit, 0) may be used to indicate that corresponding information does not exist, and 1 may be used to indicate that corresponding information exists: or F may be used to indicate that corresponding information does not exist, and T may be used to indicate that corresponding information exists. Certainly, specific indication forms are not limited to the several enumerated types, namely, 0, 1, F, and T, and other values or characters that can indicate whether the public warning system notification and the system information modification information exist are usable. It can be learned from this possible implementation that two bits are used to indicate the short message, so that the public warning system notification or the system information modification information can be directly obtained from the DCI of the power saving message, and the paging PDCCH does not need to be monitored. In this way, when the UE in the connected state is in the sleep state, the UE is not woken up to monitor the paging PDCCH. This reduces the power consumption of the UE in the connected state.

In a possible implementation of the second aspect, the downlink control information includes a third flag bit, a fourth flag bit, and a fifth flag bit, where the third flag bit indicates whether the short message exists; and when the third flag bit indicates that the short message exists, the fourth flag bit indicates the public warning system notification, and the fifth flag bit indicates the system information modification information.

In this possible implementation, using an example in which the flag bit is a bit, three bits in the DCI of the power saving message are used to indicate the short message, and the first bit in the three bits may be used to indicate whether the short message exists. If the first bit indicates that the short message exists, for indication information at the last two bits in the three bits, refer to the foregoing implementation with two bits for understanding. If the first bit in the three bits indicates that the short message does not exist, it may be considered that no short message needs to be obtained. In this case, the last two bits in the three bits may be used for other purposes such as high-reliability detection, or functions of the last two bits may be reserved for subsequent use.

In a possible implementation of the second aspect, the downlink control information includes a sixth flag bit, and the sixth flag bit indicates the public warning system notification or the system information modification information.

In this possible implementation, using an example in which the flag bit is a bit, one bit may be used to indicate one of the public warning system notification and the system information modification information. For example, considering that the UE monitors the public warning system notification for a larger quantity of times, and monitors the system information modification information for a smaller quantity of times, the bit may be used to indicate the public warning system notification. In this way, to a large extent, the UE does not need to be frequently woken up from the sleep state to monitor the public warning system notification, and the power consumption of the UE in the connected state can be reduced.

In a possible implementation of the second aspect, the DMRS includes a first cyclic shift sequence, a second cyclic shift sequence, a third cyclic shift sequence, and a fourth cyclic shift sequence, and the four cyclic shift sequences correspond to four indication states of the short message, and are used to indicate the public warning system notification and the system information modification information. For example, the first cyclic shift sequence indicates that neither the public warning system notification nor the system information modification information exists, the second cyclic shift sequence indicates that the public warning system notification exists but the system information modification information does not exist, the third cyclic shift sequence indicates that the public warning system notification does not exist but the system information modification information exists, and the fourth cyclic shift sequence indicates that both the public warning system notification and the system information modification information exist. The first cyclic shift sequence, the second cyclic shift sequence, the third cyclic shift sequence, and the fourth cyclic shift sequence may each correspond to one DMRS sequence, or may each correspond to a plurality of DMRS sequences: or a part of the first cyclic shift sequence, the second cyclic shift sequence, the third cyclic shift sequence, and the fourth cyclic shift sequence may each correspond to one DMRS sequence, and the other part may each correspond to a plurality of DMRS sequences.

In this possible implementation, the first cyclic shift sequence, the second cyclic shift sequence, the third cyclic shift sequence, and the fourth cyclic shift sequence are different DMRS cyclic shift sequences. It can be learned from this possible implementation that different DMRS cyclic shift sequences are used to indicate the short message, so that the public warning system notification and the system information modification information can be directly obtained from the DMRS, and the paging PDCCH does not need to be monitored. In this way, when the UE in the connected state is in the sleep state, the UE is not woken up to monitor the paging PDCCH. This reduces the power consumption of the UE in the connected state.

In a possible implementation of the second aspect, the DMRS includes a fifth cyclic shift sequence and a sixth cyclic shift sequence, and the cyclic shift sequences are used to indicate the public warning system notification or the system information modification information. For example, when the fifth cyclic shift sequence and the sixth cyclic shift sequence are used to indicate the public warning system notification, the fifth cyclic shift sequence may be used to indicate that the public warning system notification exists, and the sixth cyclic shift sequence may be used to indicate that the public warning system notification does not exist. When the fifth cyclic shift sequence and the sixth cyclic shift sequence are used to indicate the system information modification information, the fifth cyclic shift sequence may be used to indicate that the system information modification information exists, and the sixth cyclic shift sequence may be used to indicate that the system information modification information does not exist.

In this possible implementation, different DMRS cyclic shift sequences may be used to indicate one of the public warning system notification and the system information modification information. For example, considering that the UE monitors the public warning system notification for a larger quantity of times, and monitors the system information modification information for a smaller quantity of times, the cyclic shift sequences may be used to indicate the public warning system notification. In this way, to a large extent, the UE does not need to be frequently woken up from the sleep state to monitor the public warning system notification, and the power consumption of the UE in the connected state can be reduced.

In a possible implementation of the second aspect, the power saving message is before a discontinuous reception on duration.

In this possible implementation, whether the power saving message has a function of including the indication information of the short message, in other words, whether the power saving message has a function of indicating the short message, may be configured by a network or stipulated in a protocol. For example, it is stipulated in the protocol that a PoSS configured before the DRX on duration has the function, but a PoSS within discontinuous reception active time does not have the function. For example, a PoSS on a PDCCH scrambled based on a cell radio network temporary identifier (C-RNTI) does not have the function.

That the power saving message is before a discontinuous reception on duration indicates that there is a specific time offset between the power saving message and the discontinuous reception on duration, and the time offset is greater than 0. Certainly, the power saving message may alternatively be within the discontinuous reception on duration. In this case, the time offset is equal to 0.

In a possible implementation of the second aspect, the power saving message is a wake-up signal WUS.

In a possible implementation of the second aspect, the power saving message is two consecutive WUSs, and a time interval between monitoring occasions of the two consecutive WUSs is less than a preset time length.

In this possible implementation, the preset time length may be a time length of one modification period, or may be a time length of one default paging cycle.

The WUS has the function of indicating the short message only when the foregoing condition is satisfied, so that the UE can obtain the short message as soon as possible. This reduces a latency in obtaining the short message. When the foregoing condition is not satisfied, the UE still obtains the short message by monitoring the paging physical downlink control channel.

In a possible implementation of the second aspect, the power saving message is two consecutive WUSs, and x<N, where x is a quantity of paging frames (paging frames, PFs) between the two consecutive WUSs, and N is a quantity N of paging frames in one default paging cycle.

The WUS has the function of indicating the short message only when the foregoing condition that x<N is satisfied, so that the UE can obtain the short message as soon as possible. This reduces a latency in obtaining the short message. When the foregoing condition is not satisfied, the UE still obtains the short message by monitoring the paging physical downlink control channel.

In a possible implementation of the second aspect, the power saving message is a user equipment specific (specific UE) power saving message, and/or is a group common (group common UE) power saving message.

For example, the power saving message is the user equipment specific power saving message, that is, the UE may obtain the short message by detecting only the power saving message belonging to the UE itself, and does not need to monitor a power saving message or a paging a physical downlink control channel of other UE. In this manner, the network device may more flexibly configure discontinuous reception cycles of different UEs, and further, may more flexibly configure power saving messages of the different UEs, for example, more flexibly configure monitoring occasions and DCI formats of the power saving messages of the different UEs. The UE specific power saving message may be implemented by configuring different search spaces. For example, different UEs monitor power saving messages in different search spaces.

For another example, the power saving message is the group common power saving message. That is, a group of UEs may obtain the short message by monitoring the power saving message belonging to the group of UEs. In this manner, the network device may notify the group of UEs of the short message by sending the power saving message once, thereby reducing signal resource overheads. The group common power saving message may be implemented by configuring a same search space. For example, the group common power saving message is configured for the group of UEs by configuring a same common search space.

For another example, the power saving message is the user equipment specific (specific UE) power saving message and the group common (group common UE) power saving message. That is, both the UE specific power saving message and the group common power saving message include the indication information of the short message. In this manner, the network device may send the short message to the UE in a more reliable and timely manner. For example, when a monitoring occasion of the group common power saving message does not arrive, the network device may send the short message to the UE by using the UE specific power saving message. For another example, when the UE specific power saving message cannot be sent due to a resource collision, or when the UE misses detecting the UE specific power saving message, the UE may further obtain the short message by receiving the group common power saving message.

It may be understood that a function of the indication information, of the short message, included in the UE specific power saving message may be the same as or different from that of the indication information, of the short message, included in the group common power saving message. For example, the UE specific power saving message includes one bit used to indicate the public warning system notification, and the group common power saving message includes one bit used to indicate the system information modification information. A third aspect of this application provides a message transmission method. The method may include:

receiving a power saving message from a network device, where the power saving message carries first indication information, the first indication information indicates whether to obtain a short message by using a paging physical downlink control channel, in other words, indicate whether the short message exists, and the short message includes at least one of the following: a public warning system notification or system information modification information; and determining, based on the first indication information, whether to obtain the short message by using the paging physical downlink control channel.

In the third aspect, the power saving message may be a message having a power saving function, and is usually represented by a PoSS. The power saving message may include the first indication information indicating whether to obtain the short message by using the paging physical downlink control channel. In this way, when the first indication information indicates that the paging physical downlink control channel does not need to be monitored, it indicates that there is no short message, so that when UE is in a sleep state, the UE is not woken up to monitor the paging PDCCH. This can reduce a quantity of times of monitoring the paging PDCCH by the UE, to reduce power consumption of the UE in a connected state.

In a possible implementation of the third aspect, the power saving message is carried on a physical downlink control channel PDCCH, and the first indication information is located in downlink control information DCI or a demodulation reference signal DMRS of the power saving message.

In this possible implementation, the power saving message may be carried on the PDCCH, and the PDCCH used to carry the power saving message is different from the paging PDCCH. The first indication information may be located in the DCI, and a flag bit indicates whether to obtain the short message by using the paging physical downlink control channel. For example, 0 indicates that the paging physical downlink control channel does not need to be monitored, and this indicates that no short message exists; and 1 indicates that the paging physical downlink control channel needs to be monitored, and this indicates that the short message exists. Alternatively, F indicates that the paging physical downlink control channel does not need to be monitored, and T indicates that the paging physical downlink control channel needs to be monitored. Certainly, 0, 1, F, and T herein are merely examples for description, and other values or characters with corresponding indication functions are usable.

The first indication information may alternatively be located in the DMRS, and different cyclic shift sequences may be used to indicate whether the short message needs to be obtained by using the paging physical downlink control channel.

When different cyclic shift sequences are used for indication, details may be as follows: The DMRS includes a seventh cyclic shift sequence and an eighth cyclic shift sequence, and the seventh cyclic shift sequence and the eighth cyclic shift sequence are used to indicate whether to obtain the short message by monitoring the paging physical downlink control channel. For example, the seventh cyclic shift sequence indicates that the short message exists, that is, indicates the UE to obtain the short message by monitoring the paging physical downlink control channel, and the eighth cyclic shift sequence indicates that no short message exists, that is, indicates that the UE does not need to monitor the paging physical downlink control channel. When a DMRS sequence of the power saving message is the seventh cyclic shift sequence, the UE monitors the paging physical downlink control channel on a paging physical downlink control channel monitoring occasion following the power saving message, to obtain the short message. For example, the UE monitors the paging physical downlink control channel on the first paging physical downlink control channel monitoring occasion following the power saving message. When a DMRS sequence of the power saving message is the eighth cyclic shift sequence, it indicates that no short message exists, and the UE does not need to monitor the paging physical downlink control channel. Specifically, the UE does not need to monitor the paging physical downlink control channel before a next power saving message monitoring occasion.

In a possible implementation of the third aspect, the power saving message is a wake-up signal WUS.

A fourth aspect of this application provides a message transmission method. The method may include:

sending a power saving message to user equipment, where the power saving message carries first indication information, the first indication information indicates whether to obtain a short message by using a paging physical downlink control channel, in other words, indicate whether the short message exists, the short message includes at least one of the following: a public warning system notification or system information modification information, and the first indication information indicates the user equipment to determine whether to obtain the short message by using the paging physical downlink control channel.

In the fourth aspect, the power saving message may be a message having a power saving function, and is usually represented by a PoSS. The power saving message may include the first indication information indicating whether to obtain the short message by using the paging physical downlink control channel. In this way, when the first indication information indicates that the paging physical downlink control channel does not need to be monitored, it indicates that there is no short message, so that when the UE is in a sleep state, the UE is not woken up to monitor the paging PDCCH. This can reduce a quantity of times of monitoring the paging PDCCH by the UE, to reduce power consumption of the UE in a connected state.

In a possible implementation of the fourth aspect, the power saving message is carried on a physical downlink control channel PDCCH, and the first indication information is located in downlink control information DCI or a demodulation reference signal DMRS of the power saving message.

In this possible implementation, the power saving message may be carried on the PDCCH, and the PDCCH used to carry the power saving message is different from the paging PDCCH. The first indication information may be located in the DCI, and a flag bit indicates whether to obtain the short message by using the paging physical downlink control channel. For example, 0) indicates that the paging physical downlink control channel does not need to be monitored, and this indicates that no short message exists; and 1 indicates that the paging physical downlink control channel needs to be monitored, and this indicates that the short message exists. Alternatively, F indicates that the paging physical downlink control channel does not need to be monitored, and T indicates that the paging physical downlink control channel needs to be monitored. Certainly, 0, 1, F, and T herein are merely examples for description, and other values or characters with corresponding indication functions are usable. The first indication information may alternatively be located in the DMRS, and different cyclic shift sequences may be used to indicate whether the short message needs to be obtained by using the paging physical downlink control channel.

In a possible implementation of the fourth aspect, the power saving message is before a discontinuous reception on duration.

In this possible implementation, whether the power saving message includes the first indication information may be configured by a network or stipulated in a protocol. For example, it is stipulated in the protocol that a PoSS configured before the DRX on duration has the function, but a PoSS within discontinuous reception active time does not have the function. For example, a PoSS on a PDCCH scrambled based on a cell radio network temporary identifier (C-RNTI) does not have the function.

That the power saving message is before a discontinuous reception on duration indicates that there is a specific time offset between the power saving message and the discontinuous reception on duration, and the time offset is greater than ( ) Certainly, the power saving message may alternatively be within the discontinuous reception on duration. In this case, the time offset is equal to 0.

In a possible implementation of the fourth aspect, the power saving message is a wake-up signal WUS.

In a possible implementation of the fourth aspect, the power saving message is two consecutive WUSs, and a time interval between monitoring occasions of the two consecutive WUSs is less than a preset time length.

In this possible implementation, the preset time length may be a time length of one modification period, or may be a time length of one default paging cycle.

The WUS includes the first indication information only when the foregoing condition is satisfied, so that the UE can obtain the short message as soon as possible. This reduces a latency in obtaining the short message. When the foregoing condition is not satisfied, the UE still autonomously determines whether to obtain the short message by monitoring the paging physical downlink control channel, and cannot determine, based on the power saving message, whether to monitor the paging physical downlink control channel.

In a possible implementation of the fourth aspect, the power saving message is two consecutive WUSs, and x<N, where x is a quantity of paging frames PFs between the two consecutive WUSs, and N is a quantity N of paging frames in one default paging cycle.

The WUS includes the first indication information only when the foregoing condition that x<N is satisfied, so that the UE can obtain the short message as soon as possible.

This reduces a latency in obtaining the short message. When the foregoing condition is not satisfied, the UE still autonomously determines whether to obtain the short message by monitoring the paging physical downlink control channel, and cannot determine, based on the power saving message, whether to monitor the paging physical downlink control channel.

In a possible implementation of the fourth aspect, the power saving message is a user equipment specific power saving message, and/or is a group common power saving message.

For example, the power saving message is the user equipment specific (UE specific) power saving message, that is, the UE may obtain the first indication information by detecting only the power saving message belonging to the UE itself, and does not need to monitor a power saving message of other UE. In this manner, a network device may more flexibly configure discontinuous reception cycles of different UEs, and further, may more flexibly configure power saving messages of the different UEs, for example, more flexibly configure monitoring occasions and DCI formats of the power saving messages of the different UEs. The UE specific power saving message may be implemented by configuring different search spaces. For example, different UEs monitor power saving messages in different search spaces.

For another example, the power saving message is the group common (group common UE) power saving message. That is, a group of UEs may obtain the first indication information by monitoring the power saving message belonging to the group of UEs. In this manner, a network device may notify the group of UEs of the first indication information by sending the power saving message once, thereby reducing signal resource overheads. The group common power saving message may be implemented by configuring a same search space. For example, the group common power saving message is configured for the group of UEs by configuring a same common search space.

For another example, the power saving message is the UE specific power saving message and the group common UE power saving message. That is, both the UE specific power saving message and the group common power saving message include the first indication information. In this manner, the network device may send the first indication information to the UE in a more reliable and timely manner. For example, when a monitoring occasion of the group common power saving message does not arrive, the network device may send the first indication information to the UE by using the UE specific power saving message. For another example, when the UE specific power saving message cannot be sent due to a resource collision, or when the UE misses detecting the UE specific power saving message, the UE may further obtain the first indication information by receiving the group common power saving message.

A fifth aspect of this application provides user equipment, configured to perform the method according to any one of the first aspect or the possible implementations of the first aspect. Specifically, the user equipment includes modules or units configured to perform the method according to any one of the first aspect or the possible implementations of the first aspect.

A sixth aspect of this application provides a network device, configured to perform the method according to any one of the second aspect or the possible implementations of the second aspect. Specifically, the apparatus includes modules or units configured to perform the method according to any one of the second aspect or the possible implementations of the second aspect.

A seventh aspect of this application provides user equipment, configured to perform the method according to any one of the third aspect or the possible implementations of the third aspect. Specifically, the apparatus includes modules or units configured to perform the method according to any one of the third aspect or the possible implementations of the third aspect. An eighth aspect of this application provides a network device, configured to perform the method according to any one of the fourth aspect or the possible implementations of the fourth aspect. Specifically, the apparatus includes modules or units configured to perform the method according to any one of the fourth aspect or the possible implementations of the fourth aspect.

A ninth aspect of this application provides user equipment, including at least one processor, a memory, a transceiver, and computer-executable instructions that are stored in the memory and that can be run on the processor. When the computer-executable instructions are executed by the processor, the processor performs the method according to any one of the first aspect or the possible implementations of the first aspect.

A tenth aspect of this application provides a network device, including at least one processor, a memory, a transceiver, and computer-executable instructions that are stored in the memory and that can be run on the processor. When the computer-executable instructions are executed by the processor, the processor performs the method according to any one of the second aspect or the possible implementations of the second aspect.

An eleventh aspect of this application provides user equipment, including at least one processor, a memory, a transceiver, and computer-executable instructions that are stored in the memory and that can be run on the processor. When the computer-executable instructions are executed by the processor, the processor performs the method according to any one of the third aspect or the possible implementations of the third aspect.

A twelfth aspect of this application provides a network device, including at least one processor, a memory, a transceiver, and computer-executable instructions that are stored in the memory and that can be run on the processor. When the computer-executable instructions are executed by the processor, the processor performs the method according to any one of the fourth aspect or the possible implementations of the fourth aspect.

A thirteenth aspect of this application provides a computer-readable storage medium storing one or more computer-executable instructions. When the computer-executable instructions are executed by a processor, the processor performs the method according to any one of the first aspect or the possible implementations of the first aspect.

A fourteenth aspect of this application provides a computer-readable storage medium storing one or more computer-executable instructions. When the computer-executable instructions are executed by a processor, the processor performs the method according to any one of the second aspect or the possible implementations of the second aspect.

A fifteenth aspect of this application provides a computer-readable storage medium storing one or more computer-executable instructions. When the computer-executable instructions are executed by a processor, the processor performs the method according to any one of the third aspect or the possible implementations of the third aspect.

A sixteenth aspect of this application provides a computer-readable storage medium storing one or more computer-executable instructions. When the computer-executable instructions are executed by a processor, the processor performs the method according to any one of the fourth aspect or the possible implementations of the fourth aspect.

A seventeenth aspect of this application provides a computer program product storing one or more computer-executable instructions. When the computer-executable instructions are executed by a processor, the processor performs the method according to any one of the first aspect or the possible implementations of the first aspect.

An eighteenth aspect of this application provides a computer program product storing one or more computer-executable instructions. When the computer-executable instructions are executed by a processor, the processor performs the method according to any one of the second aspect or the possible implementations of the second aspect.

A nineteenth aspect of this application provides a computer program product storing one or more computer-executable instructions. When the computer-executable instructions are executed by a processor, the processor performs the method according to any one of the third aspect or the possible implementations of the third aspect.

A twentieth aspect of this application provides a computer program product storing one or more computer-executable instructions. When the computer-executable instructions are executed by a processor, the processor performs the method according to any one of the fourth aspect or the possible implementations of the fourth aspect.

The user equipment or the network device described in the fifth aspect to the twelfth aspect may alternatively be a chip used in the user equipment or the network device, or may be another combined part, component, or the like that has functions of the user equipment or the network device.

In the user equipment or the network device, a receiving module may be a receiver, and may include an antenna, a radio frequency circuit, and the like: a processing module may be a processor, for example, a central processing unit (central processing unit. CPU); and a sending module may be a transmitter, and may include an antenna, a radio frequency circuit, and the like. The receiver and the transmitter may be an integrated transceiver.

When the user equipment or the network device is the component having the functions of the user equipment or the network device, the receiving module may be a radio frequency unit, the processing module may be a processor, and the sending module may be a radio frequency unit.

When the user equipment or the network device is a chip system, the receiving module may be an input port of the chip system, the processing module may be a processor of the chip system, and the sending module may be an output port of the chip system.

For technical effects brought by any one of the fifth aspect, the ninth aspect, the thirteenth aspect, the seventeenth aspect, or the possible implementations thereof, refer to the technical effects brought by the first aspect or the different possible implementations of the first aspect. Details are not described herein again.

For technical effects brought by any one of the sixth aspect, the tenth aspect, the fourteenth aspect, the eighteenth aspect, or the possible implementations thereof, refer to the technical effects brought by the second aspect or the different possible implementations of the second aspect. Details are not described herein again.

For technical effects brought by any one of the seventh aspect, the eleventh aspect, the fifteenth aspect, the nineteenth aspect, or the possible implementations thereof, refer to the technical effects brought by the third aspect or the different possible implementations of the third aspect. Details are not described herein again.

For technical effects brought by any one of the eighth aspect, the twelfth aspect, the sixteenth aspect, the twentieth aspect, or the possible implementations thereof, refer to the technical effects brought by the fourth aspect or the different possible implementations of the fourth aspect. Details are not described herein again.

In the embodiments of this application, when the UE is in the connected state, the UE may obtain the indication information related to the short message by using the power saving message, for example, the POSS, instead of by monitoring the paging PDCCH, or may reduce the quantity of times of monitoring the paging PDCCH by the UE. In this way, when the UE is in the sleep state, the UE is not woken up to monitor the paging PDCCH. This reduces the power consumption of the UE in the connected state.

DESCRIPTION OF EMBODIMENTS

Figure 1:
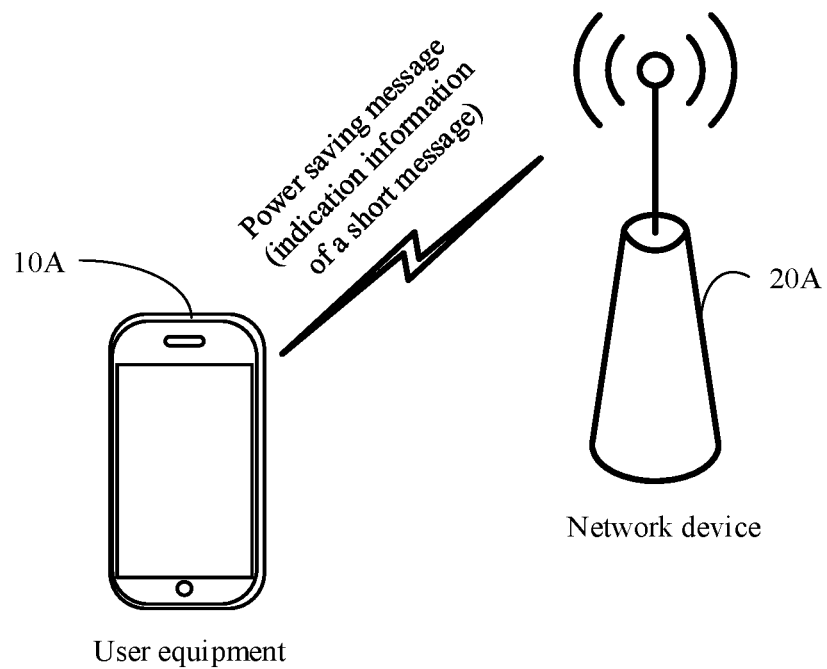
FIG. 1 is a schematic diagram of an example of a communication system according to an embodiment of this application.

The following describes embodiments of this application with reference to accompanying drawings. It is clear that the described embodiments are merely some rather than all of the embodiments of this application. Persons of ordinary skill in the art may learn that, with development of technologies and emergence of new scenarios, technical solutions provided in the embodiments of this application are also applicable to similar technical problems.

In the specification, claims, and accompanying drawings of this application, the terms "first", "second", and the like are intended to distinguish between similar objects but do not necessarily indicate a specific order or sequence. It should be understood that data termed in such a way is interchangeable in proper circumstances, so that the embodiments described herein can be implemented in other orders than the order illustrated or described herein. Moreover, the terms "include", "contain" and any other variants mean to cover non-exclusive inclusion. For example, a process, method, system, product, or device that includes a list of steps or units is not necessarily limited to those expressly listed steps or units, but may include other steps or units that are not expressly listed or inherent to the process, method, product, or device.

The embodiments of this application provide a message transmission method, to reduce power consumption of UE. The embodiments of this application further provide a corresponding device. The following separately provides description in detail.

The embodiments of this application may be applied to various communication systems, including but not limited to, a global system for mobile communications (GSM), a code division multiple access (CDMA) system, a wideband code division multiple access (WCDMA) system, a general packet radio service (GPRS) system, a long term evolution (LTE) system, a frequency division duplex long term evolution (frequency division duplex LTE, LTE-FDD) system, a time division duplex long term evolution (time division duplex LTE, LTE-TDD) system, a universal mobile telecommunications system (UMTS), other wireless communication systems using an orthogonal frequency division multiplexing (OFDM) technology, a developing 5th generation (5G) new radio (NR) communication system, and any usable communication system in the future.

The embodiments of this application are not limited to the foregoing communication systems, and may also be applied to other communication systems such as a narrow band internet of things (NB-IoT) system and a machine type communication (MTC) system, provided that in the communication systems, a network device sends a power saving message, for example, a power saving signal (PoSS), and UE in a radio resource control (RRC) connected state needs to monitor a paging physical downlink control channel (PDCCH).

It should be noted that the user equipment in the embodiments of this application may be a terminal, a chip used in the terminal, or another combined part having functions of the terminal.

The terminal in the embodiments of this application may include various handheld devices, vehicle-mounted devices, wearable devices, or computing devices that have a wireless communication function, or other processing devices connected to a wireless modem. The terminal may be a mobile station (MS), a subscriber unit, a cellular phone, a smartphone (smartphone), a wireless data card, a personal digital assistant (PDA for short) computer, a tablet computer, a wireless modem (modem), a handheld device, a laptop computer, a machine type communication (MTC) terminal, or the like.

The network device in the embodiments of this application may be a base station (BS), a NodeB, or an evolved NodeB (eNB), or may be a gNodeB (gNB), a transmission point (TP), or a Wi-Fi access point (AP) in a 5G system (or referred to as a new radio (NR) system). Certainly, the network device may alternatively be another network device that has similar base station functions and that can send the power saving message to the user equipment.

The embodiments of this application provide two solutions for indicating the UE to obtain at least one of a public warning system notification or system information modification information of a short message.

In a first solution, the power saving message carries indication information of the short message, and the at least one of the public warning system notification or the system information modification information may be obtained by using the indication information of the short message.

In a second solution, the power saving message carries first indication information used to indicate whether to obtain the short message by using a paging physical downlink control channel, whether to monitor the paging physical downlink control channel may be determined based on the first indication information, and the at least one of the public warning system notification or the system information modification information is obtained from the paging physical downlink control channel.

Figure 2:
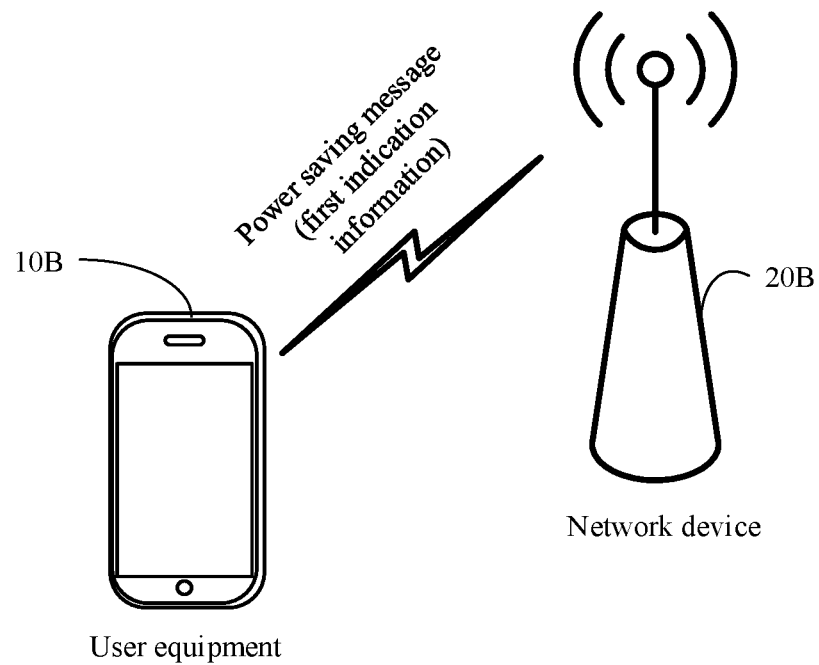
FIG. 2 is a schematic diagram of another example of a communication system according to an embodiment of this application.

The following describes a communication system related to the first solution with reference to FIG. 1, and describes a communication system related to the second solution with reference to FIG. 2.

FIG. 1 is a schematic diagram of an example of a communication system according to an embodiment of this application.

As shown in FIG. 1, an embodiment of the communication system according to this embodiment of this application includes user equipment 10A and a network device 20A. The network device 20A may send a power saving message to the user equipment 10A, where the power saving message carries indication information of a short message, and the short message includes at least one of the following: a public warning system (public warning system, PWS) notification or system information modification (SI modification) information. The user equipment 10A may obtain the short message from the power saving message.

The power saving message may be a message having a power saving function, and is usually represented by a PoSS. The power saving message may include indication information indicating whether to wake up the UE, and may further include the indication information of the short message. When the UE is in a connected state, the UE may obtain the short message by using the power saving message, for example, the POSS, instead of by monitoring a paging PDCCH. In this way, when the UE is in a sleep state, the UE is not woken up to monitor the paging PDCCH. This reduces power consumption of the UE in the connected state.

FIG. 2 is a schematic diagram of another example of a communication system according to an embodiment of this application.

As shown in FIG. 2, an embodiment of the communication system according to this embodiment of this application includes user equipment 10B and a network device 20B. The network device 20B may send a power saving message to the user equipment 10B, where the power saving message carries first indication information, the first indication information indicates whether to obtain a short message by using a paging physical downlink control channel, and the short message includes at least one of the following: a public warning system notification or system information modification information. The user equipment 10B may determine, based on the first indication information, whether to obtain the short message by using the paging physical downlink control channel.

In this embodiment of this application, when the first indication information indicates that the paging physical downlink control channel does not need to be monitored, it indicates that there is no short message, so that when the UE is in a sleep state, the UE is not woken up to monitor the paging PDCCH. This can reduce a quantity of times of monitoring the paging PDCCH by the UE, to reduce power consumption of the UE in a connected state.

With reference to the communication system shown in FIG. 1, the embodiments of this application provide a message transmission method.

Figure 3:
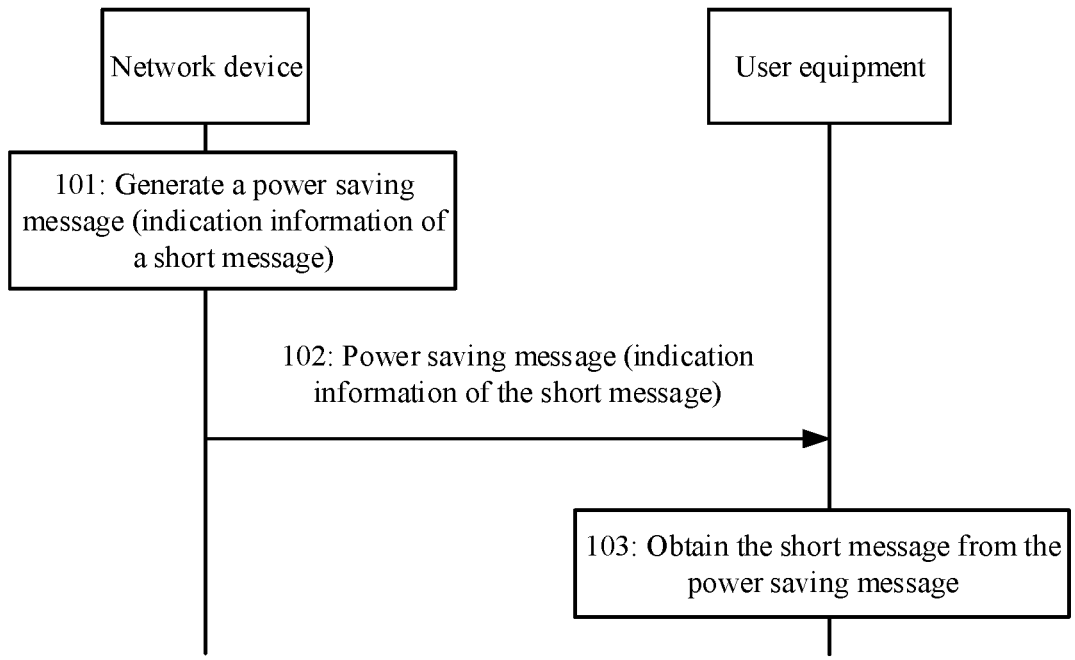
FIG. 3 is a schematic diagram of an embodiment of a message transmission method according to embodiments of this application.

As shown in FIG. 3, an embodiment of the message transmission method provided in the embodiments of this application may include the following steps.

101: A network device generates a power saving message.

The power saving message carries indication information of a short message, the short message includes at least one of the following: a public warning system notification or system information modification information, and the indication information of the short message indicates user equipment to obtain the short message from the power saving message. 102: The network device sends the power saving message to the user equipment.

103: After receiving the power saving message from the network device, the user equipment obtains the short message from the power saving message.

In this embodiment of this application, when the UE is in a connected state, the UE may obtain the short message by using the power saving message, for example, a PoSS, instead of by monitoring a paging PDCCH. In this way, when the UE is in a sleep state, the UE is not woken up to monitor the paging PDCCH. This reduces power consumption of the UE in the connected state.

In some possible embodiments, the power saving message is carried on a physical downlink control channel (physical downlink control channel, PDCCH), and the indication information of the short message is located in downlink control information (downlink control information, DCI) or a demodulation reference signal (demodulation reference signal, DMRS) of the power saving message.

The PDCCH used to carry the power saving message is different from the paging PDCCH. The indication information of the short message may be located in the DCI, and different flag bits (for example, bits) are used to indicate the public warning system notification or the system information modification information. The indication information of the short message may alternatively be located in the DMRS, and different cyclic shift sequences are used to indicate the public warning system notification or the system information modification information.

The following separately provides description by using an example in which the indication information of the short message is located in the DCI of the power saving message and an example in which the indication information of the short message is located in the DMRS of the power saving message.

When the indication information of the short message is located in the DCI of the power saving message, there may be the following three possible embodiments 1, 2, and 3:

1. The downlink control information includes a first flag bit and a second flag bit, the first flag bit indicates the public warning system notification, and the second flag bit indicates the system information modification information.

The obtaining the short message from the power saving message may include:

obtaining the public warning system notification from the first flag bit, and obtaining the system information modification information from the second flag bit.

In this possible embodiment, using an example in which the flag bit is a bit, two bits in the DCI of the power saving message are used to indicate the public warning system notification and the system information modification information. In the two bits, if the first bit indicates the public warning system notification, the second bit indicates the system information modification information; conversely, if the first bit indicates the system information modification information, the second bit indicates the public warning system notification. Specifically, for each bit, 0) may be used to indicate that corresponding information does not exist, and 1 may be used to indicate that corresponding information exists: or F may be used to indicate that corresponding information does not exist, and T may be used to indicate that corresponding information exists. Certainly, specific indication forms are not limited to the several enumerated types, namely, 0, 1, F, and T, and other values or characters that can indicate whether the public warning system notification and the system information modification information exist are usable. It can be learned from this possible embodiment that two bits are used to indicate the short message, so that the public warning system notification and the system information modification information can be directly obtained from the DCI, and the paging PDCCH does not need to be monitored. In this way, when the UE in the connected state is in the sleep state, the UE is not woken up to monitor the paging PDCCH. This reduces the power consumption of the UE in the connected state.

In this possible embodiment, two bits in the DCI of the POSS are used to indicate the short message, where one bit indicates the public warning system notification, and the other bit indicates the system information modification information.

The PoSS is not only used to indicate the short message, but also needs to give a corresponding indication when there is service data or there is no service data. With reference to cases in which the service data exists/does not exist and the short message exists/does not exist, the following further provides scenario description about whether to wake up the UE to monitor a PDCCH.

In some possible embodiments, the POSS may be represented by a wake-up signal (WUS). In some other possible embodiments, the power saving message may alternatively be a go to sleep signal (GTS). The WUS is used as an example in the following scenarios.

Scenario 1: The UE determines, by detecting whether a PDCCH WUS exists, whether to monitor the PDCCH in a corresponding discontinuous reception on duration (DRX On Duration).

In the scenario 1, if the service data exists, the network device may send the WUS, to wake up the UE to monitor the PDCCH in the corresponding DRX on duration. If the UE detects the WUS, the UE is woken up. If the service data does not exist, the network device may not send the WUS. If the UE detects no WUS, the UE does not monitor the PDCCH in the corresponding DRX on duration, and therefore does not need to be woken up.

When the network device needs to send the WUS to wake up the UE, two bits in the DCI of the WUS may be used to indicate the short message.

When the network device does not need to wake up the UE, the network device may not send the WUS if there is no short message either, that is, no system information changes and there is no PWS notification. If the UE detects no WUS, the UE considers that there is no short message, does not monitor the PDCCH in the corresponding DRX on duration, and does not need to be woken up.

When the UE has no service data but there is a short-message notification, the network device still needs to send the WUS. If the UE detects the WUS, the UE performs corresponding behavior based on a short message indicator field in the DCI of the WUS, namely, an indication by the two bits used to indicate the short message. It should be noted that in this case, although the UE has no service data, the UE still monitors the PDCCH in the corresponding DRX on duration because the UE detects the WUS. This undoubtedly increases the power consumption of the UE. Therefore, in this embodiment of this application, when there is no service data, only the short message needs to be sent to the UE by using the WUS. In this case, a specific indication in another bit field in the DCI of the WUS may be used to indicate that the network device does not need to wake up the UE. For example, all bit fields other than the two bits in the short message indicator field may be set to 0 or 1, or a part of bit fields other than the two bits may be set to 0 or 1, to indicate that the network device does not need to wake up the UE. If the UE detects DCI of such a WUS, the UE does not need to monitor the PDCCH in the corresponding DRX on duration, and only needs to obtain the short message based on the indication in the short message indicator field.

Scenario 2: One bit in the DCI of the WUS indicates whether the UE is to be woken up in a corresponding DRX on duration to monitor the PDCCH.

In the scenario 2, regardless of whether the UE has the service data, the network device may send the WUS, to indicate the UE whether to monitor the PDCCH in the corresponding DRX on duration, and indicate the short message by using two bits. For example, when the UE does not need to be woken up, one bit in the DCI of the WUS indicates that the UE does not need to be woken up; and when the UE needs to be woken up, one bit in the DCI of the WUS indicates that the UE needs to be woken up.

When there is neither the service data nor the short message (that is, no system information changes and there is no PWS notification), the network device may not send the WUS. If the UE detects no WUS, the UE does not need to be woken up in the corresponding DRX on duration to monitor the PDCCH, and therefore the UE does not need to be woken up.

In both the scenario 1 and the scenario 2, the UE is not woken up when there is no service data. This maximally reduces the power consumption of the UE in the connected state.

2. The downlink control information includes a third flag bit, a fourth flag bit, and a fifth flag bit.

The third flag bit indicates whether the short message exists.

When the third flag bit indicates that the short message exists, the fourth flag bit indicates the public warning system notification, and the fifth flag bit indicates the system information modification information.

The obtaining the short message from the power saving message may include:

when the third flag bit indicates that the short message exists, obtaining the public warning system notification from the fourth flag bit, and obtaining the system information modification information from the fifth flag bit.

In this possible embodiment, using an example in which the flag bit is a bit, three bits in the DCI of the power saving message are used to indicate the short message, and the first bit in the three bits may be used to indicate whether the short message exists. If the first bit indicates that the short message exists, for indication information at the last two bits in the three bits, refer to the foregoing embodiment with two bits for understanding. If the first bit in the three bits indicates that the short message does not exist, it may be considered that no short message needs to be obtained. In this case, the last two bits in the three bits may be used for other purposes such as high-reliability detection.

In this possible embodiment, three bits in the DCI of the POSS are used to indicate the short message, and one bit in the three bits indicates whether the short message exists, that is, whether the public warning system notification and/or the system information modification information exist/exists. The bit may also be referred to as a short message indicator field in the DCI of the POSS. One bit in the other two bits indicates the public warning system notification, and the other bit indicates the system information modification information. The two bits may also be referred to as a short message field in the DCI of the POSS.

In the possible embodiment 2, if the bit in the short message indicator field in the DCI is 0 (or 1, where 0 is used as an example herein), it indicates that no short message exists. The other two bits used to indicate the public warning system notification and the system information modification information are reserved or are used for other purposes such as the high-reliability detection.

In the possible embodiment 2 in which three bits are used to indicate the short message, for whether both the short message and service data exist and a case in which the UE is woken up, refer to the scenario 1 and the scenario 2 in the possible embodiment 1 for understanding. Details are not described herein again.

3. The downlink control information includes a sixth flag bit, and the sixth flag bit indicates the public warning system notification or the system information modification information.

The obtaining the short message from the power saving message may include:

when the sixth flag bit indicates the public warning system notification, obtaining the public warning system notification from the sixth flag bit: or when the sixth flag bit indicates the system information modification information, obtaining the system information modification information from the sixth flag bit.

In this possible embodiment, using an example in which the flag bit is a bit, one bit may be used to indicate one of the public warning system notification and the system information modification information. For example, considering that the UE monitors the public warning system notification for a larger quantity of times, and monitors the system information modification information for a smaller quantity of times, the bit may be used to indicate the public warning system notification. In this way, to a large extent, the UE does not need to be frequently woken up from the sleep state to monitor the public warning system notification, and the power consumption of the UE in the connected state can be reduced.

In addition, based on the possible embodiment 3, the message transmission method may further include:

when the sixth flag bit indicates the public warning system notification, obtaining the system information modification information from the paging physical downlink control channel: or when the sixth flag bit indicates the system information modification information, obtaining the public warning system notification from the paging physical downlink control channel.

In this possible embodiment, if one of the public warning system notification or the system information modification information is indicated by using one bit, the other may be obtained by using the paging physical downlink control channel. For example, if the public warning system notification is indicated by using one bit, the system information modification information may be obtained from the paging physical downlink control channel. It can be learned from this possible embodiment that the power consumption of the UE in the connected state is reduced as much as possible on the premise that the short message is obtained.

In this possible embodiment, for example, if the public warning system notification is indicated by using one bit in the DCI of the POSS, the UE may still learn of the system information modification information by monitoring the paging PDCCH.

For example, the POSS is the WUS, and the WUS includes one bit used to indicate whether the public warning system notification exists. If the bit is 1 (or 0, where 1 is used as an example herein), the UE considers that the public warning system notification exists. In addition, the UE may monitor the paging PDCCH at least once in each modification period (modification period), to learn, from DCI of the paging PDCCH, whether the system information modification indication exists. If the system information modification indication exists, the UE re-obtains the system information at the beginning of a next modification period.

Currently, when the UE obtains the short message by monitoring the paging PDCCH, the UE monitors the public warning system notification more frequently. The UE needs to monitor the paging PDCCH at least once in each default paging cycle to detect whether the PWS notification exists. For the system information modification indication, the UE needs to monitor the paging PDCCH at least once in each modification period to detect whether the system information changes. The modification period is at least an even multiple (twice, four times, eight times, 16 times, or more) of the default paging cycle. Therefore, the UE monitors the PWS notification more frequently, and the UE may need to monitor the system information modification indication once every long period of time. To reduce the quantity of times of monitoring the PWS notification by the UE, and to prevent a size of the DCI of the WUS from increasing much, one bit in the DCI of the WUS indicates whether the public warning system notification exists. In this way, the UE does not need to monitor the paging PDCCH at least once in each default paging cycle. This can reduce a quantity of times of monitoring the paging PDCCH by the UE and reduce the power consumption of the UE. Although the UE still needs to monitor the paging PDCCH at least once in each modification period to detect whether the system information changes, power consumption of monitoring the paging PDCCH by the UE is relatively low because the modification period may be relatively long.

When the indication information of the short message is located in the DMRS of the power saving message, there may be the following two possible embodiments A and B:

A. The DMRS includes a first cyclic shift sequence, a second cyclic shift sequence, a third cyclic shift sequence, and a fourth cyclic shift sequence, and the four cyclic shift sequences correspond to four indication states of the short message. For example, the first cyclic shift sequence indicates that neither the public warning system notification nor the system information modification information exists, the second cyclic shift sequence indicates that the public warning system notification exists but the system information modification information does not exist, the third cyclic shift sequence indicates that the public warning system notification does not exist but the system information modification information exists, and the fourth cyclic shift sequence indicates that both the public warning system notification and the system information modification information exist. The first cyclic shift sequence, the second cyclic shift sequence, the third cyclic shift sequence, and the fourth cyclic shift sequence may each correspond to one DMRS sequence, or may each correspond to a plurality of DMRS sequences: or a part of the first cyclic shift sequence, the second cyclic shift sequence, the third cyclic shift sequence, and the fourth cyclic shift sequence may each correspond to one DMRS sequence, and the other part may each correspond to a plurality of DMRS sequences.

In this possible embodiment, the first cyclic shift sequence, the second cyclic shift sequence, the third cyclic shift sequence, and the fourth cyclic shift sequence are DMRS sequences having different cyclic shifts. It can be learned from this possible embodiment that different DMRS cyclic shift sequences are used to indicate the short message, so that the public warning system notification and the system information modification information can be directly obtained from the DMRS, and the paging PDCCH does not need to be monitored. In this way, when the UE in the connected state is in the sleep state, the UE is not woken up to monitor the paging PDCCH. This reduces the power consumption of the UE in the connected state.

B. The DMRS includes a fifth cyclic shift sequence and a sixth cyclic shift sequence, and the cyclic shift sequences are used to indicate the public warning system notification or the system information modification information. For example, when the fifth cyclic shift sequence and the sixth cyclic shift sequence are used to indicate the public warning system notification, the fifth cyclic shift sequence may be used to indicate that the public warning system notification exists, and the sixth cyclic shift sequence may be used to indicate that the public warning system notification does not exist. When the fifth cyclic shift sequence and the sixth cyclic shift sequence are used to indicate the system information modification information, the fifth cyclic shift sequence may be used to indicate that the system information modification information exists, and the sixth cyclic shift sequence may be used to indicate that the system information modification information does not exist.

In this possible embodiment, two different cyclic shift sequences may be used to indicate one of the public warning system notification and the system information modification information. For example, considering that the UE monitors the public warning system notification for a larger quantity of times, and monitors the system information modification information for a smaller quantity of times, different DMRS cyclic shift sequences may be used to indicate the public warning system notification. In this way, to a large extent, the UE does not need to be frequently woken up from the sleep state to monitor the public warning system notification, and the power consumption of the UE in the connected state can be reduced.

In addition, based on the possible embodiment B, the message transmission method may further include:

when the fifth cyclic shift sequence and the sixth cyclic shift sequence are used to indicate the public warning system notification, obtaining, by the UE, the system information modification information by monitoring the paging physical downlink control channel: or when the fifth cyclic shift sequence and the sixth cyclic shift sequence are used to indicate the system information modification information, obtaining, by the UE, the public warning system notification by monitoring the paging physical downlink control channel.

In this possible embodiment, if one of the public warning system notification or the system information modification information is indicated by using different cyclic shift sequences, the other may be obtained by using the paging physical downlink control channel. For example, if the public warning system notification is indicated by using the different cyclic shift sequences, the system information modification information may be obtained from the paging physical downlink control channel. It can be learned from this possible embodiment that the power consumption of the UE in the connected state is reduced as much as possible on the premise that the short message is obtained.

For related content of the case in which the power saving message is located in the DMRS, refer to related content of the case in which the power saving message is located in the DCI for understanding. Details are not described herein again.

With reference to the communication system shown in FIG. 2, the embodiments of this application provide another message transmission method.

Figure 4:
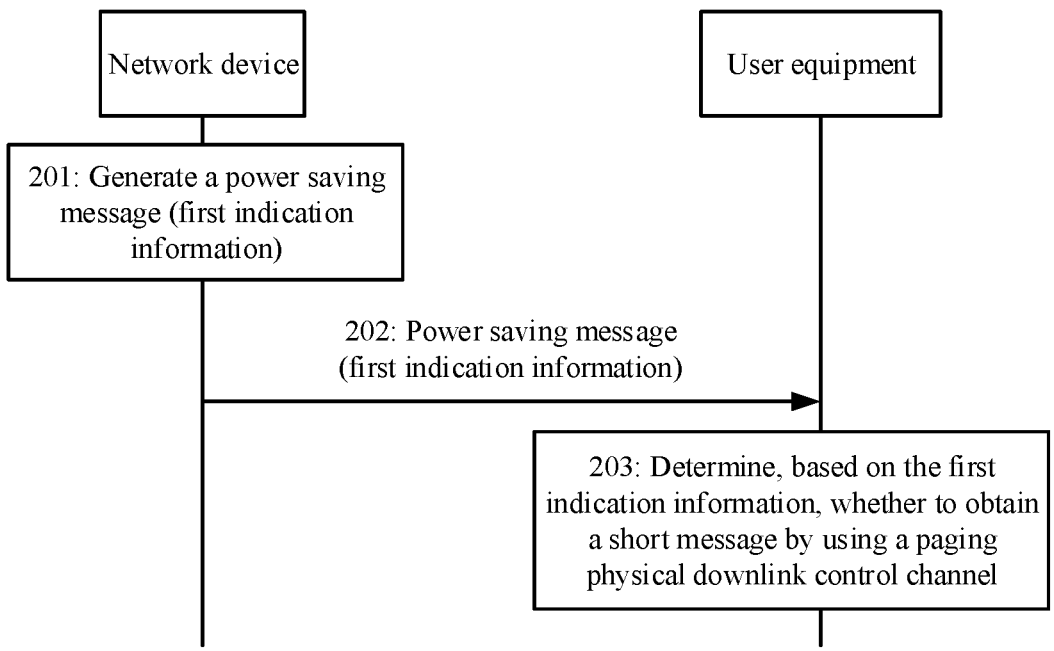
FIG. 4 is a schematic diagram of another embodiment of a message transmission method according to the embodiments of this application.

As shown in FIG. 4, an embodiment of the message transmission method provided in the embodiments of this application may include the following steps.

201: A network device generates a power saving message.

The power saving message carries first indication information, the first indication information indicates whether to obtain a short message by using a paging physical downlink control channel, the short message includes at least one of the following: a public warning system notification or system information modification information, and the first indication information indicates user equipment to determine whether to obtain the short message by using the paging physical downlink control channel. The first indication information may also be referred to as short message indicator (short message indicator) information.

202: The network device sends the power saving message to the user equipment.

203: After receiving the power saving message, the user equipment determines, based on the first indication information, whether to obtain the short message by using the paging physical downlink control channel.

In this embodiment of this application, when the first indication information indicates that the paging physical downlink control channel does not need to be monitored, it indicates that there is no short message, so that when the UE is in a sleep state, the UE is not woken up to monitor the paging PDCCH. This can reduce a quantity of times of monitoring the paging PDCCH by the UE, to reduce power consumption of the UE in a connected state. The first indication information may also be referred to as the short message indicator (short message indicator) information.

The power saving message is carried on a physical downlink control channel PDCCH, and the first indication information is located in downlink control information DCI or a demodulation reference signal DMRS of the power saving message.

In this possible embodiment, the power saving message may be carried on the PDCCH, and the PDCCH used to carry the power saving message is different from the paging PDCCH. The first indication information may be located in the DCI, and a flag bit indicates whether to obtain the short message by using the paging physical downlink control channel. For example, 0 indicates that the paging physical downlink control channel does not need to be monitored, and 1 indicates that the paging physical downlink control channel needs to be monitored. Alternatively. F indicates that the paging physical downlink control channel does not need to be monitored, and T indicates that the paging physical downlink control channel needs to be monitored. Certainly, 0, 1, F, and T herein are merely examples, and other values or characters with corresponding indication functions are usable. The first indication information may alternatively be located in the DMRS, and different cyclic shift sequences may be used to indicate whether the short message needs to be obtained by using the paging physical downlink control channel.

When different cyclic shift sequences are used for indication, details may be as follows: The DMRS includes a seventh cyclic shift sequence and an eighth cyclic shift sequence, and the seventh cyclic shift sequence and the eighth cyclic shift sequence are used to indicate whether to obtain the short message by monitoring the paging physical downlink control channel. For example, the seventh cyclic shift sequence indicates that the short message exists, that is, indicates the UE to obtain the short message by monitoring the paging physical downlink control channel, and the eighth cyclic shift sequence indicates that no short message exists, that is, indicates that the UE does not need to monitor the paging physical downlink control channel. When a DMRS sequence of the power saving message is the seventh cyclic shift sequence, the UE monitors the paging physical downlink control channel on a paging physical downlink control channel monitoring occasion following the power saving message. to obtain the short message. For example, the UE monitors the paging physical downlink control channel on the first paging physical downlink control channel monitoring occasion following the power saving message. When a DMRS sequence of the power saving message is the eighth cyclic shift sequence, it indicates that no short message exists, and the UE does not need to monitor the paging physical downlink control channel. Specifically, the UE does not need to monitor the paging physical downlink control channel before a next power saving message monitoring occasion.

Some content in the first solution corresponding to FIG. 3 is the same as that in the second solution corresponding to FIG. 4. The following describes the content applicable to both the two solutions.

In some possible embodiments, the POSS may be represented by the wake-up signal (WUS). In some other possible embodiments, the power saving message may alternatively be the go to sleep signal (GTS).

In this embodiment of this application, whether the power saving message has a function of including the indication information of the short message or the first indication information, in other words, whether the power saving message has a function of indicating the short message, may be configured by a network or stipulated in a protocol.

In some possible embodiments, the power saving message is before a discontinuous reception on duration.

In this possible embodiment, for example, it is stipulated in the protocol that a PoSS configured before the DRX on duration has the function, but a PoSS within discontinuous reception active time (DRX active time) does not have the function. For example, a PoSS on a PDCCH scrambled based on a C-RNTI does not have the function. It should be noted that this is not limited in this application. Alternatively, the POSS within the DRX active time may have the function, or the POSS on the PDCCH scrambled based on the C-RNTI may have the function.

That the power saving message is before a discontinuous reception on duration indicates that there is a specific time offset between the power saving message and the discontinuous reception on duration, and the time offset is greater than 0. Certainly, the power saving message may alternatively be within the discontinuous reception on duration. In this case, the time offset is equal to 0.

In some possible embodiments, the power saving message is two consecutive WUSs, and a time interval between monitoring occasions of the two consecutive WUSs is less than a preset time length. The preset time length may be a time length of one modification period, or may be a time length of one default paging cycle. The monitoring occasions of the two consecutive WUSs in this embodiment of this application correspond to two DRX cycles instead of one DRX cycle. This is because there may be one or more WUS monitoring occasions before a DRX on duration of one DRX cycle.

The WUS includes the indication information of the short message or the first indication information only when the foregoing condition is satisfied, so that the UE can obtain the short message as soon as possible. This reduces a latency in obtaining the short message. When the foregoing condition is not satisfied, the UE still obtains the short message by monitoring the paging physical downlink control channel.

In some possible embodiments, the power saving message is two consecutive WUSs, and x<N, where x is a quantity of paging frames (PFs) between the two consecutive WUSs, and N is a quantity N of paging frames in one default paging cycle.

The WUS includes the indication information of the short message or the first indication information only when the foregoing condition that x<N is satisfied, so that the UE can obtain the short message as soon as possible. This reduces a latency in obtaining the short message. When the foregoing condition is not satisfied, the UE still obtains the short message by monitoring the paging physical downlink control channel.

In some possible embodiments, the power saving message is a user equipment specific (UE specific) power saving message, and/or is a group common (group common UE) power saving message.

For example, the power saving message is the user equipment specific (specific UE) power saving message, that is, the UE may obtain the indication information of the short message or the first indication information by detecting only the power saving message belonging to the UE itself, and does not need to monitor a power saving message or a paging physical downlink control channel of other UE. In this manner, the network device may more flexibly configure discontinuous reception cycles of different UEs, and further, may more flexibly configure power saving messages of the different UEs, for example, more flexibly configure monitoring occasions and DCI formats of the power saving messages of the different UEs. The UE specific power saving message may be implemented by configuring different search spaces. For example, different UEs monitor power saving messages in different search spaces.

For another example, the power saving message is the group common (group common UE) power saving message. That is, a group of UEs may obtain the indication information of the short message or the first indication information by monitoring the power saving message belonging to the group of UEs. In this manner, the network device may notify the group of UEs of the indication information of the short message or the first indication information by sending the power saving message once, thereby reducing signal resource overheads. The group common power saving message may be implemented by configuring a same search space. For example, the group common power saving message is configured for the group of UEs by configuring a same common search space.

For another example, the power saving message is the user equipment specific (specific UE) power saving message and the group common (group common UE) power saving message. That is, both the UE specific power saving message and the group common power saving message include the indication information of the short message or the first indication information. In this manner, the network device may send the indication information of the short message or the first indication information to the UE in a more reliable and timely manner. For example, when a monitoring occasion of the group common power saving message does not arrive, the network device may send the indication information of the short message or the first indication information to the UE by using the UE specific power saving message. For another example, when the UE specific power saving message cannot be sent due to a resource collision, or when the UE misses detecting the UE specific power saving message, the UE may further obtain the indication information of the short message or the first indication information by receiving the group common power saving message.

It may be understood that a function of the indication information, of the short message, included in the UE specific power saving message may be the same as or different from that of the indication information, of the short message, included in the group common power saving message. For example, the UE specific power saving message includes one bit used to indicate the public warning system notification, and the group common power saving message includes one bit used to indicate the system information modification information.

In the foregoing description, that the power saving message has the function of including the indication information of the short message or the first indication information may be stipulated in the protocol or configured by the network. The following provides description in detail with reference to FIG. 5 and FIG. 6.

Figure 5:
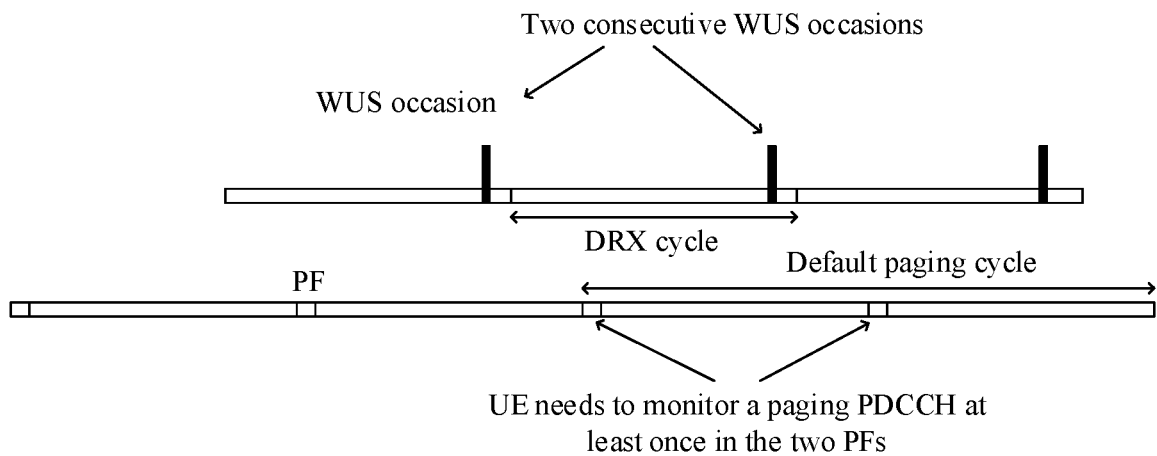
FIG. 5 is a schematic diagram of a condition example of indicating a short message in a WUS according to an embodiment of this application.

A quantity of PFs within the time length of one default paging cycle (default paging cycle) is denoted as N, and a quantity of PFs between two consecutive WUS monitoring occasions (where the two WUS occasions correspond to two DRX cycles) is denoted as x. As shown in FIG. 5, a time length of one default paging cycle includes two paging frames, in other words, N=2.

For example, it is stipulated in the protocol that the WUS configured before the DRX on duration has the function. The DCI of the WUS includes the two bits, three bits, or one bit in the first solution, or includes the one bit in the second solution. According to the protocol, if a WUS is configured for UE, and a quantity x of PFs between two consecutive WUS occasions is less than N, the two bits, three bits, or one bit in the first solution in DCI of the WUS are/indicates indication information related to a short message, or the one bit in the second solution in DCI of the WUS indicates first indication information. If x≥N, the two bits, three bits, or one bit do/does not indicate the foregoing function. Functions of these bits may be retained, in other words, these bits may be reserved (reserved); or these bits may be used for other purposes.

In an example in which that the power saving message has the function is configured by the network: If a WUS is configured for UE, and a quantity x of PFs between two consecutive WUS occasions is less than N, the network configures that the WUS has the function. That is, DCI of the WUS includes the two bits, three bits, or one bit in the first solution that are/indicates indication information related to a short message, or includes the one bit in the second solution that indicates first indication information. If a WUS is configured for UE, and a quantity x of PFs between two consecutive WUS occasions is greater than or equal to N, the network configures that the WUS does not have the function. This means that DCI of the WUS does not include indication information related to a short message, in other words, the DCI of the WUS does not include the two bits, three bits, or one bit in the first solution that are/indicates the indication information of the short message, or the WUS does not include the one bit in the second solution that indicates first indication information. A size of the DCI, of the WUS, including the indication information of the short message or the first indication information is different from that of the DCI, of the WUS, not including the indication information of the short message or the first indication information (that is, compared with the latter, the former has a field of one to three bits indicating the indication information of the short message or has a field of one bit indicating the first indication information).

A difference between the user equipment specific WUS and the group common WUS is as follows:

If DCI of the user equipment specific WUS includes one bit indicating the first indication information, WUS DCI sizes of different UEs may be the same or different. For example, for UE 1 and UE 2, if the UE 1 satisfies x<N, and the UE 2 does not satisfy x<N. WUS DCI of the UE 1 includes one bit indicating whether there is a short message, that is, the bit represents a short message indicator; and WUS DCI of the UE 2 also includes one corresponding bit, but the bit does not represent a short message indicator field, but is reserved or is used for another purpose. In this case, WUS DCI sizes of the UE 1 and the UE 2 are the same. In addition, the WUS DCI of the UE 2 may alternatively not include one corresponding bit. In this case, WUS DCI sizes of the UE 1 and the UE 2 are different, that is, the WUS DCI size of the UE 2 is smaller than the WUS DCI size of the UE 1 by one bit.

If DCI of the group common WUS includes one bit indicating the first indication information, the first indication information in the DCI of the group common WUS is valid to all users in a user group indicated by the WUS.

As shown in FIG. 5, a quantity of PFs between two consecutive WUS occasions is x=1, and the quantity of paging frames within the time length of one default paging cycle (default paging cycle) is N=2. This satisfies x<N, and in this case, a network configures that WUS DCI includes one bit indicating first indication information. In an embodiment, if the bit is 1, it indicates that there is a short message (that is, system information changes, and/or there is a PWS notification), that is, the bit indicates that UE needs to monitor a paging physical downlink control channel. In this case, the UE needs to immediately start monitoring a paging PDCCH on a next paging occasion (PO). If the bit is 0), it indicates that there is no short message. In this case, UE does not need to monitor a paging PDCCH before a next WUS occasion. According to this method, the UE monitors a paging PDCCH only when the WUS indicates that there is a short-message notification. This can reduce a quantity of times of monitoring the paging PDCCH by the UE, and reduce power consumption of the UE.

As shown in FIG. 5, if the two consecutive WUSs both indicate that there is no short-message notification, and indicate that the UE does not need to be woken up within corresponding DRX on durations to monitor the PDCCH, the UE does not need to monitor the paging PDCCH in two consecutive paging frames, and the UE may enter a sleep state in DRX cycles corresponding to the two WUSs, to reduce the power consumption of the UE. However, in a conventional technology. UE needs to monitor a paging PDCCH at least once in two consecutive paging frames to obtain a public warning system notification.

Figure 6:
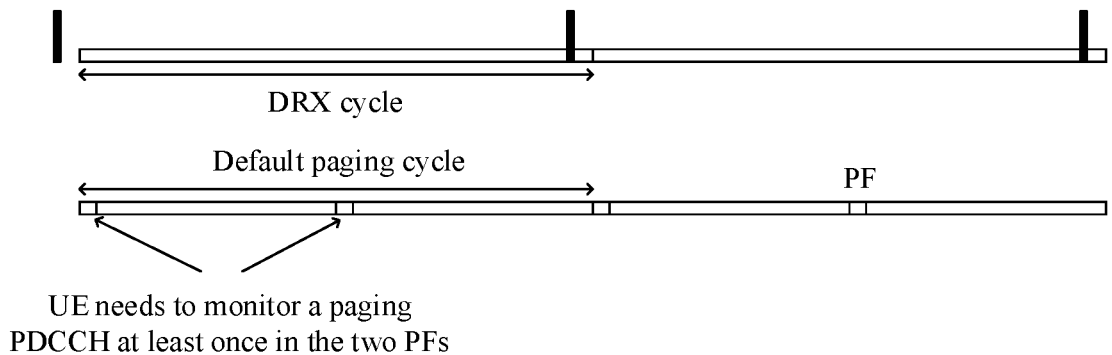
FIG. 6 is a schematic diagram of a condition example of not indicating a short message in a WUS according to an embodiment of this application.

As shown in FIG. 6, a quantity of PFs between two consecutive WUS occasions is x=2, and a quantity of paging frames within a time length of one default paging cycle is N=2. This does not satisfy x<N, and in this case, a network configures that WUS DCI does not include first indication information. In this case, UE autonomously determines, based on an actual case, whether to monitor a paging PDCCH.

In addition, in this embodiment of this application, after the UE obtains the short message, if the PWS notification exists, the UE needs to immediately obtain the system information, where the system information includes at least system information blocks such as a SIB 1, a SIB 6, a SIB 7, and a SIB 8. If the system information modification information exists, the UE may re-obtain the system information at the beginning of a next modification period, or may re-obtain the system information immediately.

In this embodiment of this application, the power saving message is introduced. Therefore, using the WUS as an example, if the WUS indicates the UE to sleep in one or more DRX cycles, the UE does not receive a transmit power control (TPC) command in scheduling DCI (for example, a DCI format 0_0/0_1/1_0/1_1)/non-scheduling DCI (for example, a DCI format 2_2/2_3) in a long period of time. The network loses uplink closed-loop power control over the UE due to a continuous change of a channel state. In other words, the UE cannot accurately update an uplink transmit power by using a power control adjustment state (power control adjustment state), and the network device cannot accurately determine a TPC command value in subsequent scheduling DCI/non-scheduling DCI.

For example, in a cumulative calculation manner of a power control adjustment state of a physical uplink shared channel (PUSCH)/physical uplink control channel (PUCCH)/sounding reference signal (SRS), after the UE sleeps for a long period of time, a previous power control adjustment state may deviate far from a current channel state due to the continuous change of the channel state. For example, the following scenario is considered: If the UE is woken up after sleeping for a long period of time, and if the UE needs to resume periodically reporting channel state information (CSI) on the PUCCH or resume periodically/semi-persistently sending the SRS, or the WUS triggers, while indicating the UE to wake up, the UE to send an aperiodic uplink signal, the transmit power of the UE needs to be obtained by adding open-loop power control parameters (a parameter configured by using higher layer RRC signaling, a parameter determined in a protocol according to a specific rule, and a path loss parameter obtained by measuring a reference signal) to a closed-loop power control parameter (namely, the power control adjustment state). In the cumulative calculation manner of the power control adjustment state, a current power control adjustment state is equal to the previous power control adjustment state plus a latest TPC command value, but the previous power control adjustment state may deviate far from the current channel state. Consequently, the transmit power calculated by the UE cannot reflect the current channel state more accurately. For example, if the calculated transmit power is excessively high, interference is caused to another user: or if the calculated transmit power is excessively low: a detection requirement of the network cannot be met.

For another example, after the UE sleeps for a long period of time, the network device receives no uplink signal SRS or no uplink channel PUCCH/PUSCH of the UE for a long period of time. After the UE is woken up from the sleep state, if the network device cannot receive the uplink signal SRS or the uplink channel PUCCH/PUSCH of the UE in time, the network device cannot track the current channel state of the UE. If the network device needs to send a scheduling PDCCH or a non-scheduling PDCCH, the network device cannot accurately determine, based on the current channel state, a TPC command value that should be included in DCI.

In addition, in the cumulative calculation manner of the power control adjustment state of the PUSCH/PUCCH/SRS, even if the network device tracks the current channel state by measuring the uplink signal SRS from the UE, the network device may also fail to determine an appropriate TPC command value to adapt to the current channel state. This is because a bit field indicating the TPC command value includes only two bits, and values that can be indicated by the bit field are limited. If the previous power control adjustment state deviates far from the current channel state, the network device cannot obtain a most appropriate power control adjustment state by sending a TPC command value once and then adding the TPC command value to the previous power control adjustment state.

For the foregoing problem of power control, this embodiment of this application provides two solutions. The following separately describes the two solutions.

In a first solution, in this embodiment of this application, whether the WUS is to trigger aperiodic uplink sending may be configured by the network or stipulated in a protocol. If the WUS triggers the aperiodic uplink sending, when a preset condition is satisfied, the UE needs to set a corresponding power control adjustment state (power control adjustment state) to 0 when calculating the uplink transmit power. That is, the UE calculates only the open-loop power control parameter instead of the closed-loop power control parameter when determining the transmit power of the aperiodic uplink sending.

For example, the UE sets $g_{b,f,c}(i,l)$ to 0 when calculating a PUCCH transmit power (unit: dBm) on an aperiodic PUCCH sending occasion i according to the following formula:

$$P_{PUCCH,b,f,c}(i, q_u, q_d, l) = \min\left\{\begin{array}{l} P_{CMAX,f,c}(i), \\ P_{O\_PUCCH,b,f,c}(q_u) + 10\log_{10}(2^\mu \cdot M_{RB,b,f,c}^{PUCCH}(i)) + PL_{b,f,c}(q_d) + \Delta_{F\_PUCCH}(F) + \Delta_{TF,b,f,c}(i) + g_{b,f,c}(i, l) \end{array}\right\}$$

$g_{b,f,c}(i,l)$ is a power control adjustment state of a PUCCH, namely, a closed-loop power control parameter for calculating the PUCCH transmit power, and parameters other than $g_{b,j,c}(i,l)$ are all referred to as open-loop power control parameters.

For example, the UE sets $h_{b,f,c}(i,l)$ to 0 when calculating an SRS transmit power (unit: dBm) on an aperiodic SRS sending occasion i according to the following formula:

$$P_{SRS,b,f,c}(i, q_s, l) = \min\left\{\begin{array}{l} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) + PL_{b,f,c}(q_d) + h_{b,f,c}(i, l) \end{array}\right\}$$

$h_{b,f,c}(i,l)$ is a power control adjustment state of an SRS, namely, a closed-loop power control parameter for calculating the SRS transmit power, and parameters other than $h_{b,j,c}(i,l)$ are all referred to as open-loop power control parameters.

For example, the UE sets $f_{b,j,c}(i,l)$ to 0 when calculating a PUSCH transmit power (unit: dBm) on an aperiodic PUSCH sending occasion i according to the following formula:

$$P_{PUSCH,b,f,c}(i, j, q_d, l) = \min\left\{\begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array}\right\}$$

$f_{b,j,c}(i,l)$ is a power control adjustment state of a PUSCH, namely, a closed-loop power control parameter for calculating the PUSCH transmit power, and parameters other than $f_{b,f,c}(i,l)$ are all referred to as open-loop power control parameters.

The foregoing preset condition, may be in the following three possible implementations:

Implementation 1: The network configures a timer timer 1. When the WUS indicates the UE to wake up, when the UE does not detect the WUS or detects no WUS but is woken up within the DRX on duration to monitor the PDCCH, or when the WUS monitoring occasion is covered by active time (for example, is covered by a timing period of previous drx-Inactivity Timer), the timer timer 1 is started or restarted (timer restart) at the WUS monitoring occasion (for example, a start orthogonal frequency division multiplexing (OFDM) symbol or an end OFDM symbol of the WUS monitoring occasion, or the first OFDM symbol following the WUS monitoring occasion). After timing of the timer 1 ends (in other words, the timer 1 expires), if the WUS indicates the UE to wake up, and the WUS triggers aperiodic sending of the PUCCH/PUSCH/SRS, the UE needs to set a corresponding power control adjustment state to 0 when calculating an aperiodic uplink transmit power.

Implementation 2: The network configures a timer timer 2. Once active time ends, the timer timer 2 is started (or restarted) after the active time ends. Specifically, the timer timer 2 may be started at the first symbol following the end of the active time. If the UE enters the active time again during timing of the timer 2, the timing of the timer 2 is stopped. After timing of the timer 2 naturally ends (in other words, the timer 2 expires), if the WUS indicates the UE to wake up, and the WUS triggers aperiodic sending of the PUCCH/PUSCH/SRS, the UE needs to set a corresponding power control adjustment state to 0 when calculating an aperiodic uplink transmit power.

The foregoing active time includes: running time periods of the following timers: drx-on DurationTimer, drx-Inactivity Timer, drx-RetransmissionTimerDL, drx-RetransmissionTimerUL, or ra-ContentionResolutionTimer, a time period of waiting for a response from the network device after the UE sends a scheduling request on the PUCCH, or a time period from a moment at which the UE successfully receives a random access response for contention-free random access to a moment at which the UE receives a PDCCH indicating new transmission.

Implementation 3: The network configures a counter 1, and configures a parameter value N, where an initial value of the counter 1 is 0. If the WUS indicates the UE to wake up, the counter 1 does not count. If the counter 1 is counting, in other words, a current count value is not 0, a count value of the counter 1 is reset to 0. If the WUS indicates the UE not to wake up, or the UE is not woken up within a DRX on duration to monitor the PDCCH, the count value of counter 1 is increased by 1. If the count value of the counter 1 is greater than or equal to N when the WUS indicates the UE to wake up, and the WUS triggers aperiodic sending of the PUCCH/PUSCH/SRS, the UE needs to set a corresponding power control adjustment state (power control adjustment state) to 0 when calculating an aperiodic uplink transmit power.

It is noted that a case in which the WUS does not include the TPC command value is considered above. When the WUS triggers an aperiodic PUCCH/PUSCH/SRS, and cumulative calculation is performed on the power control adjustment state, the foregoing manner may be implemented by resetting all power control adjustment states previous to a current transmission occasion i to 0. For example, for the power control adjustment state of the PUSCH, when the foregoing preset condition is satisfied, the power control adjustment state is reset to $f_{b,f,c}(k,l)=0$, where k=0, 1, ..., or i. When absolute calculation is performed on the power control adjustment state, because the WUS does not include the TPC command value, the current power control adjustment state is 0).

If the WUS includes the TPC command value, the current power control adjustment state $g_{b,f,c}(i,l)/f_{b,f,c}(i,l)/h_{b,f,c}(i,l)$ is not set to 0), but all the previous power control adjustment states are reset to 0. For example, $f_{b,f,c}(k,l)=0$, where k=0, 1, ..., or i−1. In this way, regardless of the cumulative calculation manner or the absolute calculation manner, a transmit power of the aperiodic PUCCH/PUSCH/SRS triggered by the WUS is the TPC command value carried in the WUS DCI.

A function of the aperiodic uplink signal that the WUS triggers the UE to send is to enable the network device to detect whether the uplink transmit power of the UE meets the requirement of the network device, so that the network device determines a subsequent power adjustment command, namely, the TPC command, based on the aperiodic signal from the UE.

Uplink signals that are sent include:
an aperiodic SRS:
an aperiodic PUCCH carrying a known sequence, where the sequence may be an acknowledgment (ACK) sequence or another known sequence, and may be a gold sequence, a golden sequence, an m sequence, or a ZC sequence, and this is not specifically limited:
a PDCCH-ordered PRACH sequence, namely, a contention-free (contention-free) random access sequence signal: or
an aperiodic PUSCH carrying CSI reporting information (for example, a channel quality indicator (CQI) or a rank indicator (RI)).
Uplink resources for the uplink signals that are sent may include:

(1) The uplink sending resource may be pre-configured in association with the WUS occasion. That is, when configuring the WUS by using RRC signaling, the network device configures the uplink sending resource associated with the WUS, where the RRC signaling includes time/frequency domain configuration information (for example, a frequency domain start position, a frequency domain bandwidth, a quantity of time domain slots, and a symbol location in a slot) of the uplink sending resource, a time offset from the WUS, and the like.

(2) The network configures time/frequency domain configuration information of the uplink resource by using RRC signaling, but a specific time offset from the WUS is explicitly indicated by the WUS.

(3) The WUS DCI carries scheduling information of the uplink resource (that is, the scheduling information indicates time-frequency domain position information).

The network may configure a minimum offset between the WUS and the aperiodic uplink sending triggered by the WUS. For example, the network configures a parameter: a minimum triggering offset. That is, an aperiodic uplink resource configured by the network or an aperiodic uplink resource scheduled by using the WUS does not appear within the minimum triggering offset starting from the WUS monitoring occasion. In addition, the network may also configure a minimum slot offset between the WUS and the aperiodic uplink sending triggered by the WUS. For example, the WUS triggers, in a cross-slot manner, the UE to perform aperiodic uplink sending, in other words, the WUS and the aperiodic uplink sending resource of the UE are in different slots.

A manner of triggering the aperiodic uplink sending of the WUS may include:

Example 1: It is configured by the network or stipulated in a protocol that one bit in the DCI of the WUS is used to explicitly indicate whether to trigger the UE to send an aperiodic uplink signal. If the UE detects no WUS, the UE does not send an aperiodic uplink signal/channel, and the UE is not woken up.

Example 2: It is configured by the network or stipulated in a protocol that if the WUS indicates the UE to wake up, it is considered by default that the UE is triggered to send an aperiodic uplink signal/channel on an uplink resource associated with a WUS sending occasion. If the WUS indicates the UE not to monitor the PDCCH, or the UE detects no WUS, the UE does not send the aperiodic uplink signal/channel.

In this embodiment of this application, the WUS triggers the aperiodic sending of the uplink signal/channel, so that the network device can detect whether the uplink transmit power of the UE meets a requirement of the network device. Therefore, the network device determines the subsequent power adjustment command, namely, the TPC command, based on the aperiodic signal from the UE. In addition, after the UE sleeps for a specific period of time, it is stipulated that the UE calculates, by using only the open-loop power control parameter, the transmit power of the aperiodic uplink sending that is performed by the UE, that is, all power control adjustment states previous to a sending occasion of the aperiodic uplink signal/channel triggered by the WUS are reset to 0. In this way, the UE can track the current channel state in a timely and accurate manner, and the network device can quickly determine the subsequent TPC command based on the aperiodic uplink sending performed by the UE. This helps improve performance of an uplink.

In a second solution, in this embodiment of this application, the WUS does not trigger aperiodic uplink sending.

When the preset condition in the first solution is satisfied, the UE needs to reset all power control adjustment states (power control adjustment states) previous to a WUS monitoring occasion to 0. In this way, in the cumulative calculation manner of the power control adjustment state, after the UE is woken up and enters the active time (for example, drx-onDurationTimer is started), assuming that a sending occasion on which the UE sends a PUCCH/PUSCH/SRS for the first time is i, all power control adjustment commands previous to the sending occasion i are 0). That is, for a power control adjustment command for the PUCCH, $g_{b,f,c}(k,l)=0$, where k=0, 1, 2, . . . , or i−1: for a power control adjustment command for the PUSCH, $f_{b,f,c}(k,l)=0$, where k=0, 1, . . . , or i−1; and for a power control adjustment command for the SRS, $h_{b,f,c}(k,l)=0$, where k=0, 1, . . . , or i−1.

The foregoing preset condition, may be in the following three implementations:

Implementation 1: The network configures a timer timer 1. When the WUS indicates the UE to wake up, when the UE does not detect the WUS or detects no WUS but is woken up within the DRX on duration to monitor the PDCCH, or when the WUS monitoring occasion is covered by active time (for example, is covered by a timing period of previous drx-Inactivity Timer), the timer is started or restarted (timer restart) at the WUS monitoring occasion (for example, a start OFDM symbol or an end OFDM symbol of the WUS monitoring occasion, or the first OFDM symbol following the WUS monitoring occasion). After timing of the timer 1 ends (in other words, the timer 1 expires), if the WUS indicates the UE to wake up, all power control adjustment states previous to the WUS monitoring occasion are reset to 0).

Implementation 2: The network configures a timer timer 2. Once active time ends, the timer timer 2 is started (or restarted) after the active time ends. Specifically, the timer timer 2 may be started at the first symbol following the end of the active time. If the UE enters the active time again during timing of the timer 2, the timing of the timer 2 is stopped. After timing of the timer 2 naturally ends (in other words, the timer 2 expires), if the WUS indicates the UE to wake up, all power control adjustment states previous to the WUS monitoring occasion are reset to 0).

Implementation 3: The network configures a counter 1, and configures a parameter value N, where an initial value of the counter 1 is 0). If the WUS indicates the UE to wake up, the counter 1 does not count. If the counter 1 is counting, in other words, a current count value is not 0, a count value of the counter 1 is reset to 0. If the WUS indicates the UE not to wake up, or the UE is not woken up within a DRX on duration to monitor the PDCCH, the count value of counter 1 is increased by 1. If the count value of the count 1 is greater than or equal to N when the WUS indicates the UE to wake up, all power control adjustment states previous to the WUS monitoring occasion are reset to 0).

In this embodiment of this application, in the cumulative calculation manner of the power control adjustment state, after the UE sleeps for a specific period of time, it is stipulated that all the power control adjustment states previous to the WUS are reset to 0), so that the transmit power calculated by the UE can more accurately match the current channel state. This helps improve performance of an uplink.

It should be noted that, to make the description brief, the foregoing method embodiments are expressed as a series of actions. However, persons skilled in the art should learn that the present application is not limited to the described action sequence, because according to the present application, some steps may be performed in other sequences or performed simultaneously. In addition, persons skilled in the art should also learn that all the embodiments described in this specification are example embodiments, and the related actions and modules are not necessarily mandatory to the present application.

The message transmission method is described in the foregoing embodiments. The following describes related user equipment and a related network device in the embodiments of this application with reference to the accompanying drawings.

Figure 7:
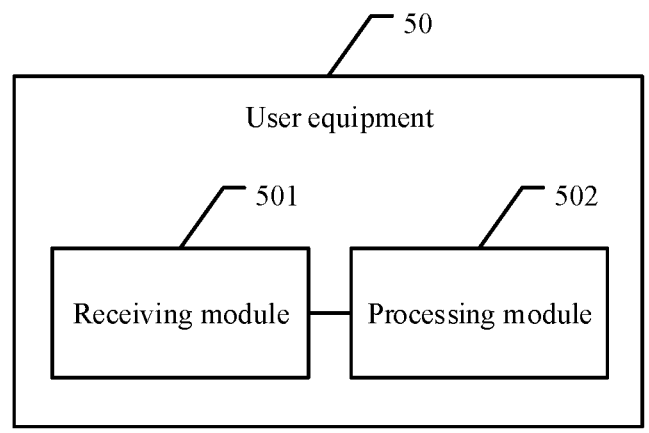
FIG. 7 is a schematic diagram of an embodiment of user equipment according to the embodiments of this application.

As shown in FIG. 7, an embodiment of this application provides user equipment, and the user equipment 50 includes:

a receiving module 501, configured to receive a power saving message from a network device, where the power saving message carries indication information of a short message, and the short message includes at least one of the following: a public warning system notification or system information modification information; and a processing module 502, configured to obtain the short message from the power saving message received by the receiving module 501.

In some embodiments of this application, the power saving message is carried on a physical downlink control channel PDCCH, and the indication information of the short message is located in downlink control information DCI or a demodulation reference signal DMRS of the power saving message.

In some embodiments of this application, the downlink control information includes a first flag bit and a second flag bit, the first flag bit indicates the public warning system notification, and the second flag bit indicates the system information modification information; and the processing module 502 is configured to obtain the public warning system notification from the first flag bit, and obtain the system information modification information from the second flag bit.

In some embodiments of this application, the downlink control information includes a third flag bit, a fourth flag bit, and a fifth flag bit, where the third flag bit indicates whether the short message exists: when the third flag bit indicates that the short message exists, the fourth flag bit indicates the public warning system notification, and the fifth flag bit indicates the system information modification information; and the processing module 502 is configured to: when the third flag bit indicates that the short message exists, obtain the public warning system notification from the fourth flag bit, and obtain the system information modification information from the fifth flag bit.

In some embodiments of this application, the downlink control information includes a sixth flag bit, and the sixth flag bit indicates the public warning system notification or the system information modification information; and the processing module 502 is configured to: when the sixth flag bit indicates the public warning system notification, obtain the public warning system notification from the sixth flag bit: or when the sixth flag bit indicates the system information modification information, obtain the system information modification information from the sixth flag bit.

In some embodiments of this application, the processing module 502 is further configured to: when the sixth flag bit indicates the public warning system notification, obtain the system information modification information from a paging physical downlink control channel: or when the sixth flag bit indicates the system information modification information, obtain the public warning system notification from a paging physical downlink control channel.

In some embodiments of this application, the power saving message is a wake-up signal WUS.

In some embodiments, still refer to FIG. 7. An embodiment of this application provides user equipment, and the user equipment 50 includes:

- a receiving module 501, configured to receive a power saving message from a network device, where the power saving message carries first indication information, the first indication information indicates whether to obtain a short message by using a paging physical downlink control channel, and the short message includes at least one of the following: a public warning system notification or system information modification information; and
- a processing module 502, configured to determine, based on the first indication information, whether to obtain the short message by using the paging physical downlink control channel.

In some embodiments of this application, the power saving message is carried on a physical downlink control channel PDCCH, and the first indication information is located in downlink control information DCI or a demodulation reference signal DMRS of the power saving message.

In some embodiments of this application, the power saving message is a wake-up signal WUS.

Figure 8:
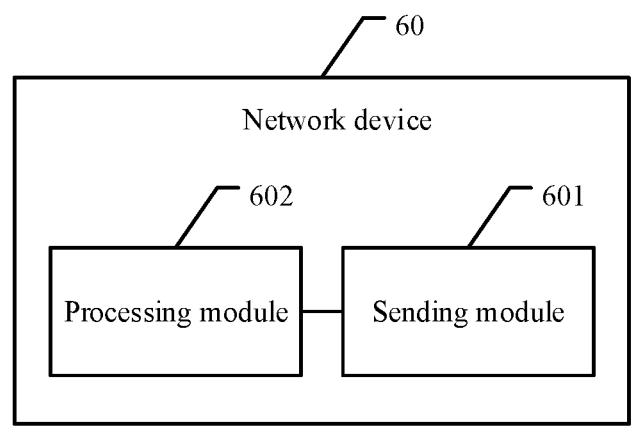
FIG. 8 is a schematic diagram of an embodiment of a network device according to the embodiments of this application.

As shown in FIG. 8, an embodiment of this application provides a network device, and the network device 60 includes:

- a sending module 601, configured to send a power saving message to user equipment, where the power saving message carries indication information of a short message, the short message includes at least one of the following: a public warning system notification or system information modification information, and the indication information of the short message indicates the user equipment to obtain the short message from the power saving message.

In some embodiments of this application, the network device 60 further includes a processing module 602.

The processing module 602 is configured to generate the power saving message, where the power saving message carries the indication information of the short message, the short message includes the at least one of the following: the public warning system notification or the system information modification information, and the indication information of the short message indicates the user equipment to obtain the short message from the power saving message.

The power saving message is carried on a physical downlink control channel PDCCH, and the indication information of the short message is located in downlink control information DCI or a demodulation reference signal DMRS of the power saving message.

In some embodiments of this application, the downlink control information includes a first flag bit and a second flag bit, the first flag bit indicates the public warning system notification, and the second flag bit indicates the system information modification information.

In some embodiments of this application, the downlink control information includes a third flag bit, a fourth flag bit, and a fifth flag bit, where the third flag bit indicates whether the short message exists; and when the third flag bit indicates that the short message exists, the fourth flag bit indicates the public warning system notification, and the fifth flag bit indicates the system information modification information.

In some embodiments of this application, the downlink control information includes a sixth flag bit, and the sixth flag bit indicates the public warning system notification or the system information modification information.

In some embodiments of this application, the power saving message is before a discontinuous reception on duration.

In some embodiments of this application, the power saving message is a wake-up signal WUS.

In some embodiments of this application, the power saving message is two consecutive WUSs, and a time interval between monitoring occasions of the two consecutive WUSs is less than a preset time length.

In some embodiments of this application, the power saving message is two consecutive WUSs, and x<N, where x is a quantity of paging frames PFs between the two consecutive WUSs, and N is a quantity N of paging frames in one default paging cycle.

In some embodiments of this application, the power saving message is a user equipment specific power saving message, and/or is a group common power saving message.

In some embodiments, still refer to FIG. 8. An embodiment of this application provides a network device, and the network device 60 includes:

- a sending module 601, configured to send a power saving message to user equipment, where the power saving message carries first indication information, the first indication information indicates whether to obtain a short message by using a paging physical downlink control channel, the short message includes at least one of the following: a public warning system notification or system information modification information, and the first indication information indicates the user equipment to determine whether to obtain the short message by using the paging physical downlink control channel.

In some embodiments of this application, the network device 60 further includes a processing module 602.

The processing module 602 is configured to generate the power saving message, where the power saving message carries the first indication information, the first indication information indicates whether to obtain the short message by using the paging physical downlink control channel, and the short message includes the at least one of the following: the public warning system notification or the system information modification information.

In some embodiments of this application, the power saving message is carried on a physical downlink control channel PDCCH, and the first indication information is located in downlink control information DCI or a demodulation reference signal DMRS of the power saving message.

In some embodiments of this application, the power saving message is before a discontinuous reception on duration.

In some embodiments of this application, the power saving message is a wake-up signal WUS.

In some embodiments of this application, the power saving message is two consecutive WUSs, and a time interval between monitoring occasions of the two consecutive WUSs is less than a preset time length.

In some embodiments of this application, the power saving message is two consecutive WUSs, and x<N, where x is a quantity of paging frames PFs between the two consecutive WUSs, and N is a quantity N of paging frames in one default paging cycle.

In some embodiments of this application, the power saving message is a user equipment specific power saving message, and/or is a group common power saving message.

It should be noted that because content such as message exchange and execution processes between the modules of the user equipment and the network device is based on the same concept as the method embodiments of this application, technical effects of the content are the same as those of the method embodiments of the present application. For specific content, refer to the foregoing description in the method embodiments of this application. Details are not described herein again.

An embodiment of this application further provides a computer storage medium. The computer storage medium stores a program. The program is executed to perform some or all of the steps set forth in the foregoing method embodiments.

Figure 9:
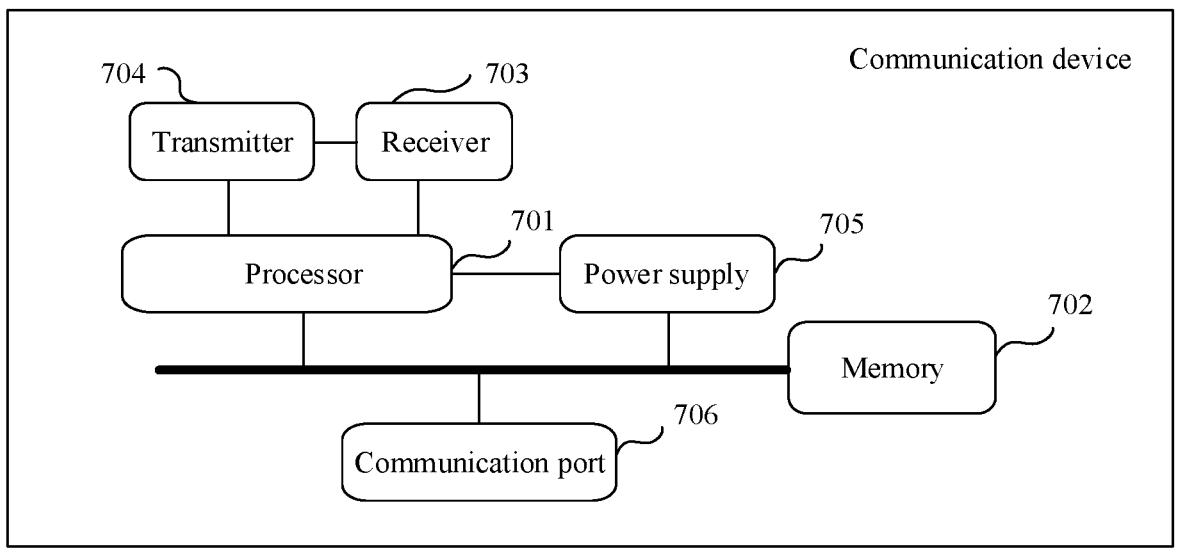
FIG. 9 is a schematic diagram of an embodiment of a computer device according to the embodiments of this application.

FIG. 9 is a schematic diagram of a structure of still another communication device according to an embodiment of this application. The communication device may be user equipment, or may be a network device. The communication device may include a processor 701 (for example, a CPU), a memory 702, a transmitter 704, and a receiver 703. The transmitter 704 and the receiver 703 are coupled to the processor 701, and the processor 701 controls a sending action of the transmitter 704 and a receiving action of the receiver 703. The memory 702 may include a high-speed RAM, or may include a nonvolatile memory NVM, for example, at least one magnetic disk memory. The memory 702 may store various instructions used to perform various processing functions and implement the method steps in the embodiments of this application. Optionally, the communication device in this embodiment of this application may further include one or more of a power supply 705 and a communication port 706. The components described in FIG. 7 may be connected via a communication bus, or may be connected in another connection manner. This is not limited in this embodiment of this application. The receiver 703 and the transmitter 704 may be integrated into a transceiver of the communication device, or may be independent receive and transmit antennas of the communication device. The communication bus is configured to implement communication connections between the components. The communication port 706 is configured to implement connection and communication between the communication device and another peripheral device.

In some embodiments, the processor 701 in the communication device may perform an action performed by the processing module 502 in FIG. 7, and the receiver 703 in the communication device may perform an action performed by the receiving module 501 in FIG. 7. Implementation principles and technical effects thereof are similar, and details are not described herein again.

In some embodiments, the processor 701 in the communication device may perform an action performed by the processing module 602 in FIG. 8, and the transmitter 704 in the communication device may perform an action performed by the sending module 601 in FIG. 8. Implementation principles and technical effects thereof are similar, and details are not described herein again.

In some embodiments, the memory 702 is configured to store computer-executable program code. The program code includes instructions. When the processor 701 executes the instructions, the instructions enable the processor 701 to perform an action performed by the processing module in the communication device in the foregoing embodiments, and enable the transmitter 704 to perform an action performed by the sending module in the communication device in the foregoing embodiments. Implementation principles and technical effects thereof are similar, and details are not described herein again.

This application further provides a chip system. The chip system includes a processor, configured to support the foregoing communication device in implementing functions related to the communication device, for example, receiving or processing data and/or information in the foregoing method embodiments. In a possible design, the chip system further includes a memory. The memory is configured to store program instructions and data that are necessary for a computer device. The chip system may include a chip, or may include a chip and another discrete part.

All or some of the foregoing embodiments may be implemented through software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to the embodiments of the present application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A message transmission method, comprising:
   receiving, by a user equipment (UE), a power saving message, wherein the power saving message carries a short message, first indication information, second indication information, and third indication information, the first indication information indicates whether to obtain the short message by using a next paging occasion (PO) on a physical downlink control channel (PDCCH), the second indication information indicates whether the short message is a public warning system notification, the third indication information indicates whether the short message is system information modification information, and the short message comprises at least one of the following: the public warning system notification or the system information modification information; and
   determining, by the UE and based on the first indication information, to obtain the short message from the power saving message and to not monitor the next PO on the PDCCH.

2. The method according to claim 1, wherein the power saving message is carried on the PDCCH, and the first indication information is located in downlink control information (DCI) or a demodulation reference signal (DMRS) of the power saving message.

3. The method according to claim 1, wherein the first indication information is a flag bit, wherein a first state of the flag bit indicates the UE to monitor the next PO on the PDCCH, and wherein a second state of the flag bit indicates the UE to not monitor the next PO on the PDCCH).

4. The method according to claim 1, wherein the power saving message is a group common power saving message.

5. The method according to claim 1, wherein the power saving message is a wake-up signal (WUS).

6. A message transmission method, comprising:
   sending a power saving message to user equipment, wherein the power saving message carries a short message, first indication information, second indication information, and third indication information, the first indication information indicates whether to obtain the short message by using a next paging occasion (PO) on a physical downlink control channel (PDCCH), the second indication information indicates whether the short message is a public warning system notification, the third indication information indicates whether the short message is system information modification information, and the short message comprises at least one of the following: the public warning system notification or the system information modification information.

7. The method according to claim 6, wherein the power saving message is carried on the PDCCH, and the first indication information is located in downlink control information (DCI) or a demodulation reference signal (DMRS) of the power saving message.

8. The method according to claim 6, wherein the first indication information is a flag bit, wherein a first state of the flag bit indicates the UE to monitor the next PO on the PDCCH, and wherein a second state of the flag bit indicates the UE to not monitor the next PO on the PDCCH).

9. The method according to claim 6, wherein the power saving message is a group common power saving message.

10. The method according to claim 6, wherein the power saving message is a wake-up signal (WUS).

11. A user equipment, comprising:
    at least one processor; and
    a memory storing programming instructions for execution by the at least one processor, the programming instructions instructing the user equipment to perform operations comprising:
    receiving a power saving message from a network device, wherein the power saving message carries a short message, first indication information, second indication information, and third indication information, the first indication information indicates whether to obtain the short message by using a next paging occasion (PO) on a physical downlink control channel (PDCCH), the second indication information indicates whether the short message is a public warning system notification, the third indication information indicates whether the short message is system information modification information, and the short message comprises at least one of the following: the public warning system notification or the system information modification information; and
    determining, based on the first indication information, to obtain the short message from the power saving message and to not monitor the next PO on the PDCCH.

12. The user equipment according to claim 11, wherein the power saving message is carried on the PDCCH, and the first indication information is located in downlink control information (DCI) or a demodulation reference signal (DMRS) of the power saving message.

13. The user equipment according to claim 11, wherein the first indication information is a flag bit, wherein a first state of the flag bit indicates the UE to monitor the next PO on the PDCCH, and wherein a second state of the flag bit indicates the UE to not monitor the next PO on the PDCCH.

14. The user equipment according to claim 11, wherein the power saving message is a group common power saving message.

15. The user equipment according to claim 11, wherein the power saving message is a wake-up signal (WUS).

16. A network device, comprising:
at least one processor; and
a memory storing programming instructions for execution by the at least one processor, the programming instructions instructing the network device to perform operations comprising:
sending a power saving message to user equipment, wherein the power saving message carries a short message, first indication information, second indication information, and third indication information, the first indication information indicates whether to obtain the short message by using a next paging occasion (PO) on a physical downlink control channel (PDCCH), the second indication information indicates whether the short message is a public warning system notification, the third indication information indicates whether the short message is system information modification information, and the short message comprises at least one of the following: the public warning system notification or the system information modification information.

17. The network device according to claim 16, wherein the power saving message is carried on the PDCCH, and the first indication information of the short message is located in downlink control information (DCI) or a demodulation reference signal (DMRS) of the power saving message.

18. The network device according to claim 16, wherein the first indication information is a flag bit, wherein a first state of the flag bit indicates the UE to monitor the next PO on the PDCCH, and wherein a second state of the flag bit indicates the UE to not monitor the next PO on the PDCCH.

19. The network device according to claim 16, wherein the power saving message is a group common power saving message.

20. The network device according to claim 16, wherein the power saving message is a wake-up signal (WUS).

* * * * *